United States Patent
Okubo et al.

(10) Patent No.: US 7,221,799 B2
(45) Date of Patent: May 22, 2007

(54) IMAGE PROCESSING BASED ON DEGREE OF WHITE-BACKGROUND LIKELINESS

(75) Inventors: Hiromi Okubo, Kanagawa (JP); Hiroyuki Shibaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/274,169

(22) Filed: Nov. 16, 2005

(65) Prior Publication Data
US 2006/0078220 A1    Apr. 13, 2006

Related U.S. Application Data

(63) Continuation of application No. 09/663,843, filed on Sep. 15, 2000, now Pat. No. 6,987,886.

(30) Foreign Application Priority Data

Sep. 17, 1999  (JP)  ............................. 11-264203
Dec. 28, 1999  (JP)  ............................. 11-374257
Aug. 31, 2000  (JP)  ............................. 2000-264421

(51) Int. Cl.
*G06K 9/48*    (2006.01)

(52) U.S. Cl. .................... 382/199; 382/266; 382/190

(58) Field of Classification Search ................ 382/165, 382/170, 171, 173, 181, 190, 195, 199, 260–269
See application file for complete search history.

(56) References Cited

U.S. PATENT DOCUMENTS 4,326,258 A * 4/1982 de la Guardia ............. 382/137
4,979,129 A * 12/1990 Okubo et al. ............... 345/600
5,003,616 A *  3/1991 Orita et al. .................. 382/282
5,101,446 A *  3/1992 Resnikoff et al. ........... 382/248
5,323,247 A *  6/1994 Parker et al. ............... 358/3.08
5,410,619 A *  4/1995 Fujisawa et al. ............ 382/254
5,473,444 A * 12/1995 Sakano et al. .............. 358/461

(Continued)

FOREIGN PATENT DOCUMENTS

JP        5-307603        11/1993

(Continued)

OTHER PUBLICATIONS

Chesnaud et al., "Statistical region snake-based segmentation adapted to different physical noise models", IEEE, Pattern Analysis and Machine Intelligence on pp. 1145-1157, vol. 21, Nov. 1999.

(Continued)

*Primary Examiner*—Jingge Wu
*Assistant Examiner*—Brian Le
(74) *Attorney, Agent, or Firm*—Oblon, Spivak, McClelland, Maier & Neustadt, P.C.

(57) ABSTRACT

An image processing device includes a filtering unit which filters an input image with variable frequency characteristics, an edge detection unit which detects magnitudes of edges appearing in the input image, and a degree-of-white-background-likeliness detection unit which detects degrees of white-background likeliness in respect of local areas of the input image, wherein the filtering unit changes the variable frequency characteristics in response to the magnitudes of edges and to the degrees of white-background likeliness.

3 Claims, 44 Drawing Sheets

U.S. PATENT DOCUMENTS

| | | | |
|---|---|---|---|
| 5,600,736 A * | 2/1997 | Hagita | 382/209 |
| 5,742,410 A * | 4/1998 | Suzuki | 358/518 |
| 5,748,804 A * | 5/1998 | Surka | 382/291 |
| 5,754,708 A * | 5/1998 | Hayashi et al. | 382/266 |
| 5,832,123 A * | 11/1998 | Oyamada | 382/237 |
| 6,026,199 A * | 2/2000 | Sommer | 382/252 |
| 6,041,139 A * | 3/2000 | Okubo et al. | 382/199 |
| 6,049,635 A * | 4/2000 | Hayashi et al. | 382/266 |
| 6,058,201 A | 5/2000 | Sikes et al. | |
| 6,222,642 B1 | 4/2001 | Farrell et al. | |
| 6,347,156 B1 * | 2/2002 | Kamada et al. | 382/237 |
| 6,529,629 B2 | 3/2003 | Li et al. | |
| 6,608,701 B1 | 8/2003 | Loce et al. | |
| 6,674,478 B2 | 1/2004 | Miyazaki et al. | |
| 6,806,903 B1 * | 10/2004 | Okisu et al. | 348/254 |

FOREIGN PATENT DOCUMENTS

| | | |
|---|---|---|
| JP | 6-131455 | 5/1994 |
| JP | 6-133159 | 5/1994 |
| JP | 8-204953 | 8/1996 |
| JP | 9-102875 | 4/1997 |

OTHER PUBLICATIONS

Kay et al., Edge detection using the linear model, IEEE, Acoustics, Speech, and Signal Processing on pp. 1221-1227, vol. 34, Oct. 1986.

* cited by examiner

FIG. 3

| -1 | -3 | -4 | -3 | -1 |
|----|----|----|----|----|
| -3 | 3  | 4  | 3  | -3 |
| -4 | 4  | 32 | 4  | -4 |
| -3 | 3  | 4  | 3  | -3 |
| -1 | -3 | -4 | -3 | -1 |

|    | -1 |    |
|----|----|----|
| -1 | 4  | -1 |
|    | -1 |    |

FIG. 6

| -1 | -1 | 0 | 1 | 1 |
|----|----|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

| -1 | -1 | -1 | -1 | -1 |
|----|----|----|----|----|
| -1 | -1 | -1 | -1 | -1 |
| 0  | 0  | 0  | 0  | 0  |
| 1  | 1  | 1  | 1  | 1  |
| 1  | 1  | 1  | 1  | 1  |

| -1 | -1 | -1 | -1 | 0 |
|----|----|----|----|---|
| -1 | -1 | -1 | 0  | 1 |
| -1 | -1 | 0  | 1  | 1 |
| -1 | 0  | 1  | 1  | 1 |
| 0  | 1  | 1  | 1  | 1 |

| 0 | -1 | -1 | -1 | -1 |
|---|----|----|----|----|
| 1 | 0  | -1 | -1 | -1 |
| 1 | 1  | 0  | -1 | -1 |
| 1 | 1  | 1  | 0  | -1 |
| 1 | 1  | 1  | 1  | 0  |

× 1/10

\* PIXEL OF INTEREST
◩ DETECTED AS WHITE-BACKGROUND PIXEL
▨ EXPANDED AREA
▓ BLACK PIXEL

FIG. 27

| −1 | −3 | −4 | −3 | −1 |
|---|---|---|---|---|
| −3 | 3 | 4 | 3 | −3 |
| −4 | 4 | 32 | 4 | −4 |
| −3 | 3 | 4 | 3 | −3 |
| −1 | −3 | −4 | −3 | −1 |

| 1 | 1 | 1 |
|---|---|---|
| 1 | 2 | 1 |
| 1 | 1 | 1 |

| 0  | 0  | -2 | 0  | 0  |
|----|----|----|----|----|
| 0  | -2 | -3 | -2 | 0  |
| -2 | -3 | 44 | -3 | -2 |
| 0  | -2 | -3 | -2 | 0  |
| 0  | 0  | -2 | 0  | 0  |

× 1/16

IMAGE PROCESSING BASED ON DEGREE OF WHITE-BACKGROUND LIKELINESS

CROSS-REFERENCE TO RELATED APPLICATIONS

This application is a continuation of co-pending U.S. patent application Ser. No. 09/663,843, filed Sep. 15, 2000 now U.S. Pat. No. 6,987,886, and in turn claims priority to Japan Patent 11-264203, filed Sep. 17, 1999, Japan Patent 11-374257, filed Dec. 28, 1999 and Japan Patent 2000-264421, filed Aug. 31, 2000, the entire contents of each of which are hereby incorporated herein by reference.

BACKGROUND OF THE INVENTION

1. Field of the Invention

The present invention generally relates to image-processing devices for processing image data, and particularly relates to an image-processing device which processes image data on an area-by-area basis according to characteristics of each image area, being suitable for an image-processing system such as a digital copier, a printer, a facsimile device, an image scanner, or the like wherein data is supplied from an image-data acquisition device such as a scanner for acquiring an original image, and is processed for better image quality.

2. Description of the Related Art

A Japanese Patent Laid-open Application No. 5-307603 discloses a method that applies sufficient smoothing to mesh-dot images while maintaining sharp appearances at edges of letters and line drawings, and that enhances edges even within mesh-dot image areas and/or photograph image areas. To achieve this, this method mixes at least two types of image data which are selected from original image data, edge-enhanced image data obtained by filtering the image data, and smoothed image data obtained by filtering the image data.

The document described above further teaches a method for better reproduction of letter images on white backgrounds. This method selects one of the original image data output, the edge-enhanced image data output, the smoothed image data output, and an output obtained by mixing these image data outputs based on edge analysis. Decisions in such selection are made by detecting white-background areas in the original image and by checking whether an area of interest belongs to the white-background areas.

In general, image-processing devices do not have sufficient image-reproduction quality in areas where letters are present if these devices are provided with gamma correction characteristics that focus on smooth level changes in picture areas. For example, fine lines may appear broken from place to place, and letters in light tone may appear in poor quality. To obviate this problem, there is a method that detects features of picture areas and letter areas, and applies different image processing to the respective areas with an aim of improving image quality. A Japanese Patent Laid-open Application No. 8-204953 discloses a white-background-area detection means and a plurality of level-conversion means, and teaches a method that selectively switches the level-conversion means based on the detection results of the white-background-area detection means.

The Japanese Patent Laid-open Application No. 5-307603 has a drawback in that processing volume increases unduly because all the edge-enhancement filtering process, the smoothing filtering process, and the like need to be performed and completed prior to selection based on the white-background detection. Further, if the white-background detection suffers errors, loss of image quality is substantial in the configuration where filtered data is selected based on presence/absence of white backgrounds.

The Japanese Patent Laid-open Application No. 8-204953 employs a white-background detection scheme that is disclosed in a Japanese Patent Lain-open Application No. 6-133159. In this scheme, the detected image areas do not necessarily include white-background areas and boundary areas thereof, so that reproduction quality of letters is poor in the boundary areas. If the boundary areas are also subjected to different processing, proper sizes of boundary areas need to be identified for such processing.

The Japanese Patent Laid-open Application No. 8-204953 is silent about such boundary areas, and, also, fails to identify the type of image data that is fed to the white-background-area detection means.

There are other schemes that separate letter areas from picture areas by using image features relating to edge detection and mesh-dot detection, and apply optimum gamma correction to each area. Image separation-based on edge detection or the like involves a large processing volume, and is thus costly. Further, such edge detection tends to produce detection results indicative of presence of large edges in mesh-dot image areas despite their nature as a picture if there are frequency components that happen to match the filter frequency characteristics used in the edge detection, or if the mesh-dot image areas include sharp changes of image levels, or if the mesh-dot image areas include only a small number of lines. This results in erroneous image-area separation.

Further, if image processing is performed based on binary-wise checks as to whether areas are white-background areas or non-white-background areas, information regarding the degree to which areas are close to white backgrounds ends up being disregarded. Such processing tends to be unstable. If a pixel is marked as a white background pixel in areas where pixels should be marked as non-white-background pixels, changes in image characteristics resulting from image processing become locally conspicuous, resulting in degradation of image quality. Further, if image characteristics are changed stepwise, reproduced images do not have smooth appearance.

Accordingly, there is a need for an image-processing-device which can change image characteristics on a continuous scale or on a multi-level scale, rather than changing image characteristics as a choice between two alternatives based on binary-wise checks as to whether areas are white-background areas or non-white-background areas.

Further, there is a need for an image-processing device which attends to image processing by detecting white-background areas and boundary areas thereof when image characteristics are changed as a choice between two alternatives based on binary-wise checks as to whether areas are white-background areas or non-white-background areas.

Moreover, there is a need for an image-processing device that can enhance sharpness of letters and line drawings reliably on white backgrounds by employing a simple device configuration while reproducing edges clearly in picture areas and suppressing moiré generation in mesh-dot image areas.

Further, there is a need for an image-processing device that can improve reproduction quality of letters and line drawings on white backgrounds by employing a simple device configuration, with a particular emphasis on detection of letter contours without detecting inner edges of letters that would be detected when straightforward edge detection is employed.

SUMMARY OF THE INVENTION

It is a general object of the present invention to provide an image processing device that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by the image processing device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image processing device including a filtering unit which filters an input image with variable frequency characteristics, an edge detection unit which detects magnitudes of edges appearing in the input image, and a degree-of-white-background-likeliness detection unit which detects degrees of white-background likeliness in respect of local areas of the input image, wherein the filtering unit changes the variable frequency characteristics in response to the magnitudes of edges and to the degrees of white-background likeliness.

In detail, the image processing device described above has the filter frequency characteristics changed so as to enhance high frequency components to an increased degree as the degrees of white-background likeliness increase and as the magnitudes of edges increase. This makes it possible to reliably improve sharpness of letters and line drawings on the white backgrounds by use of a simple device configuration. Further, the filtering unit may include a first filter having a frequency characteristic that is space invariant over all the areas of the input image, and include a second filter having a high-frequency-enhancement characteristic with an output thereof adjusted according to the magnitudes of edges and the degrees of white-background likeliness, wherein the frequency characteristic of the first filter maintains sharpness of letters and line drawings while suppressing generation of moiré in the mesh-dot areas. With this configuration, the image processing device can reproduce clear edges in continuous-tone image areas such as photograph areas while suppressing generation of moiré in mesh-dot image areas.

Further, an image processing device according to another aspect of the present invention includes a degree-of-white-background-likeliness detection unit which detects degrees of white-background likeliness in respect of local areas of an input multi-level image, and a gray-level conversion unit which converts gray levels of the input multi-level image according to conversion characteristics that change in response to the degrees of white-background likeliness.

According to the image processing device as described above, the gray levels of the input image are converted according to different gray-level conversion characteristics varying depending on the degrees of white-background likeliness. The image processing device can thus improve reproduction quality of letter and line drawings on the white-background areas by use of a simple configuration.

The present invention is also directed to methods of image processing and image processing systems that are practiced or operate based on the same principles as the image processing devices described above.

BRIEF DESCRIPTION OF THE DRAWINGS

FIG. 3 is an illustrative drawing showing an example of a first filter shown in FIG. 2;

FIG. 4 is an illustrative drawing showing an example of a second filter shown in FIG. 2;

FIG. 6 is an illustrative drawing showing a first-order differential filter having a horizontal differential direction;

FIG. 7 is an illustrative drawing showing a first-order differential filter having a vertical differential direction;

FIG. 8 is an illustrative drawing showing a first-order differential filter having a diagonal differential direction;

FIG. 9 is an illustrative drawing showing a first-order differential filter having the other diagonal differential direction;

FIG. 27 is an illustrative drawing showing an example of a filter configuration of the filtering unit shown in FIG. 26;

FIG. 28 is an illustrative drawing showing another example of a filter configuration of the filtering unit shown in FIG. 26;

FIG. 30 is an illustrative diagram showing a filter configuration of a filtering unit shown in FIG. 29;

DESCRIPTION OF THE PREFERRED EMBODIMENTS

In the following, embodiments of the present invention will be described with reference to the accompanying drawings.

<First Embodiment>

Figure 1:
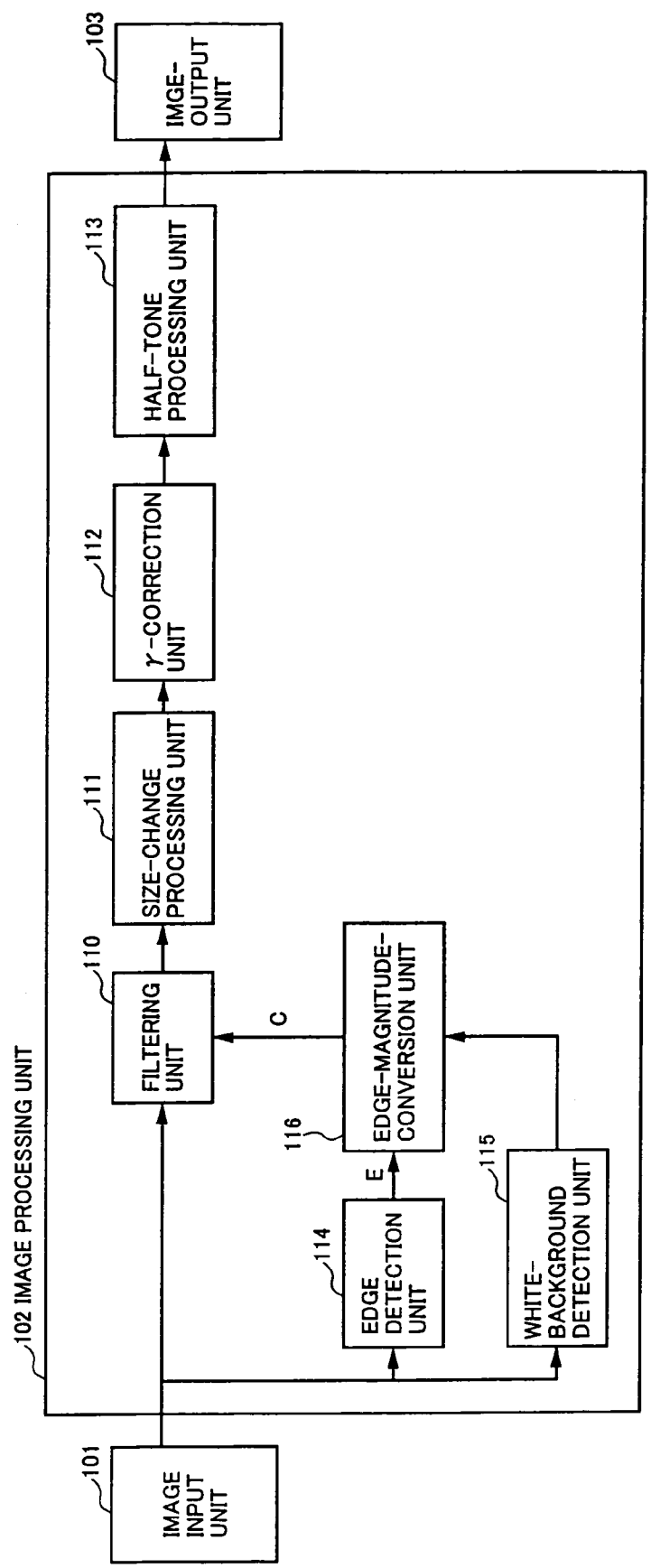
FIG. 1 is a block diagram of an image-processing device according to a first embodiment of the present invention.

FIG. 1 is a block diagram of an image-processing device according to a first embodiment of the present invention.

In FIG. 1, an image input unit 101 reads original documents, and supplies digitized image signals to a filtering unit 110, an edge detection unit 114, and a white-background detection unit 115 provided in an image processing unit 102. When the image signals are received in the image processing-unit 102, the filtering unit 110 applies a filtering process to convert frequency characteristics of the image in response to an edge magnitude (filter factor C) supplied from an edge-magnitude-conversion unit 116. A size-change processing unit 111 enlarges or makes smaller image sizes according to a specified size-change factor by electrically processing image signals. Resulting signals are supplied to a gamma-correction unit 112.

The gamma-correction unit 112 converts gray-level characteristics into desired gray-level characteristics with respect to a data path from the original image to the output image of an image-output unit 103. The converted image signals are supplied to a half-tone processing unit 113. The half-tone processing unit 113 attends to half-tone processing such as dither processing or error-diffusion processing, and supplies the processed signals to the image-output unit 103. The image-output unit 103 reproduces the image on a sheet of paper or the like.

In the image processing unit 102, when the image signal are received from the image input unit 101, the edge detection unit 114 detects an edge magnitude E reflecting gradients of local image density, and a white-background detection unit 115 detects white-background areas and boundary areas thereof. The edge-magnitude-conversion unit 116 converts the edge magnitude E detected by the edge detection unit 114 into a filter factor C, which is suitably usable in the processing of the filtering unit 110. The conversion of the edge magnitude by the edge-magnitude-conversion unit 116 varies depending on whether an area being processed belongs to the white-background areas and the boundary areas thereof or belongs to other areas. This is determined based on the results of white-background detection produced by the white-background detection unit 115, as will be described later in detail.

Figure 2:
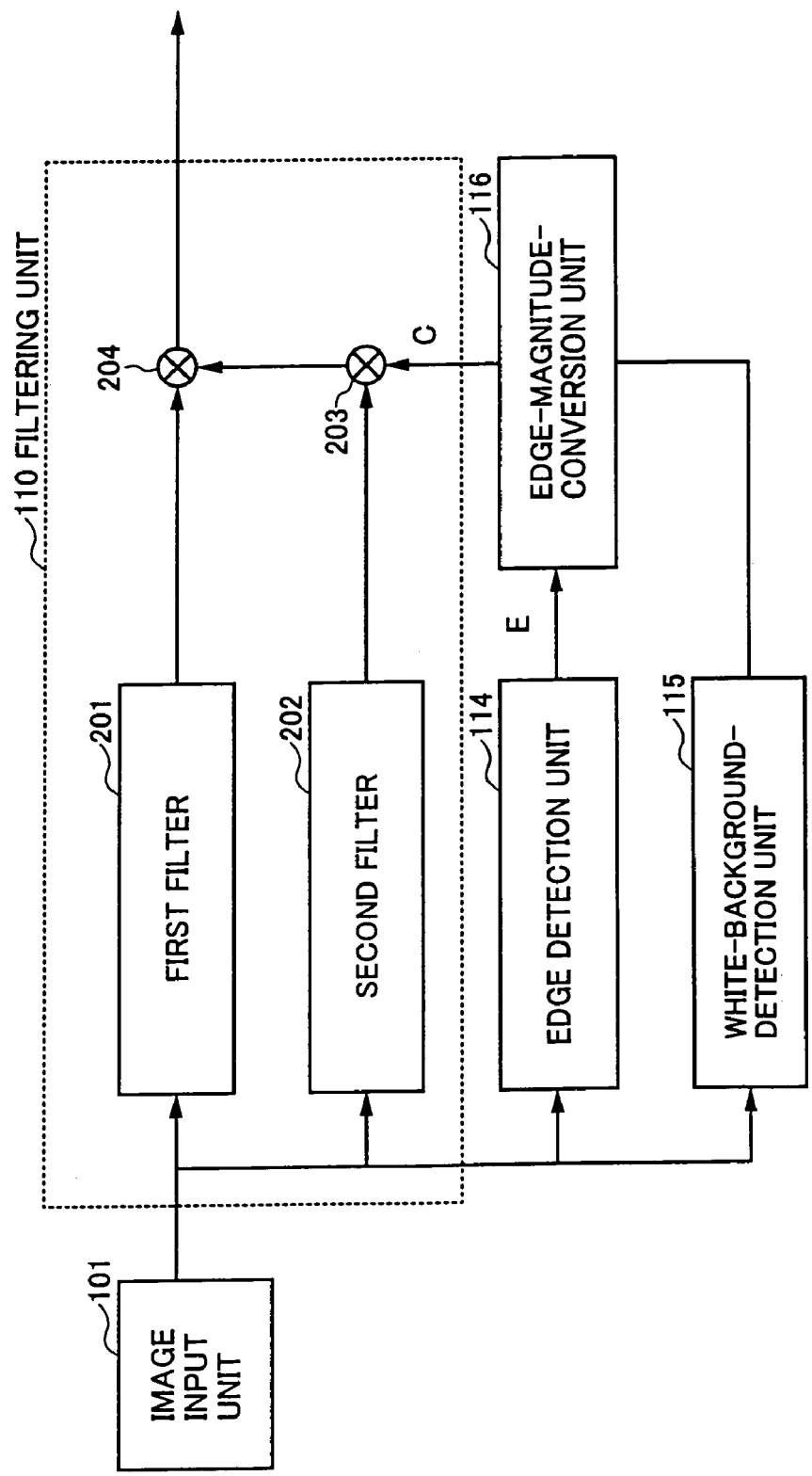
FIG. 2 is a block diagram of a filtering unit.

FIG. 2 is a block diagram of the filtering unit 110 shown in FIG. 1.

The image signals from the image input unit 101 are supplied to a first filter 201 and a second filter 202, which apply respective 2-dimensional spatial filtering processes to the received image signals.

FIG. 3 is an illustrative drawing showing an example of the first filter 201. FIG. 3 shows a set of filter coefficients corresponding to 5×5 pixels where the filter has a band-enhancement characteristic. Filter characteristics of this filter serve to reduce moiré that would be generated at a time of printing mesh dots, and also serve to maintain sharpness of letters and line drawings.

FIG. 4 is an illustrative drawing showing an example of the second filter 202. FIG. 4 shows a second-order differential filter having 5 pixels. This filter generates an output only at edges where image density changes.

As shown in FIG. 2, the filtering unit 110 includes a multiplication unit 203 that multiplies the output of the second filter 202 by the filter factor C, which is obtained from the edge magnitude E by the edge-magnitude-conversion unit 116. Further, the filtering unit 110 includes an adder unit 204 that adds the result of the multiplication to the output of the first filter 201. The result of adding operation is supplied to the size-change processing unit 111 provided at the subsequent stage.

In the following, details of the edge detection unit 114 will be described below.

Figure 5:
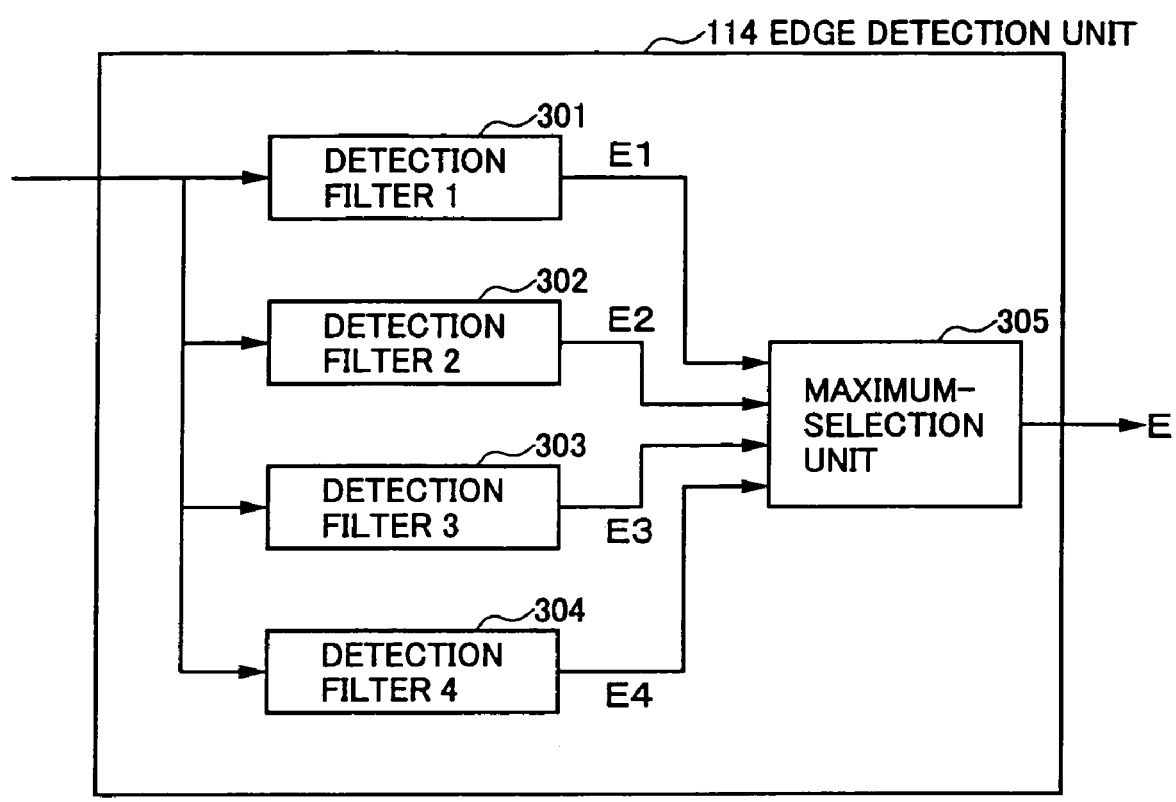
FIG. 5 is a block diagram of an edge detection unit shown in FIG. 1.

FIG. 5 is a block diagram of the edge detection unit 114 shown in FIG. 1.

The edge detection unit 114 includes first through fourth detection filters 301 through 304 that detect respective edge magnitudes E1 through E4 from the received image signals. The edge detection unit 114 further includes a maximum-selection unit 305 that selects a maximum E from the edge magnitudes E1 through E4. The selected maximum E is supplied to the edge-magnitude-conversion unit 116. In this embodiment, each of the detection filters 301 through 304 is a first-order differential filter having 5×5 pixels, and corresponds to one of a vertical differential direction, a horizontal differential direction, a diagonal differential direction, and the other diagonal differential direction.

FIG. 6 is an illustrative drawing showing a first-order differential filter having a horizontal differential direction. FIG. 7 is an illustrative drawing showing a first-order differential filter having a vertical differential direction. FIG. 8 is an illustrative drawing showing a first-order differential filter having a diagonal differential direction. FIG. 9 is an illustrative drawing showing a first-order differential filter having the other diagonal differential direction.

The detection filters 301 through 304 shown in FIG. 6 through FIG. 9 obtain values indicative of gray-level gradients in local image areas (i.e., 5-x-5-pixel areas). Absolute values of the obtained values are then output as the edge magnitudes E1 through E4. The maximum-selection unit 305 selects the largest of the edge magnitudes E1 through E4 detected by the detection filters 301 through 304, and outputs the selected edge magnitude as the maximum E. In this example, the first-order differential filters having the 5-x-5-pixel size and four different differential directions are used for the purpose of detecting edge magnitudes. It should be noted, however, that the filter size may be changed depending on edge structures to be detected, other differential directions may be employed, or a second-order differential characteristic may be added.

Figure 10:
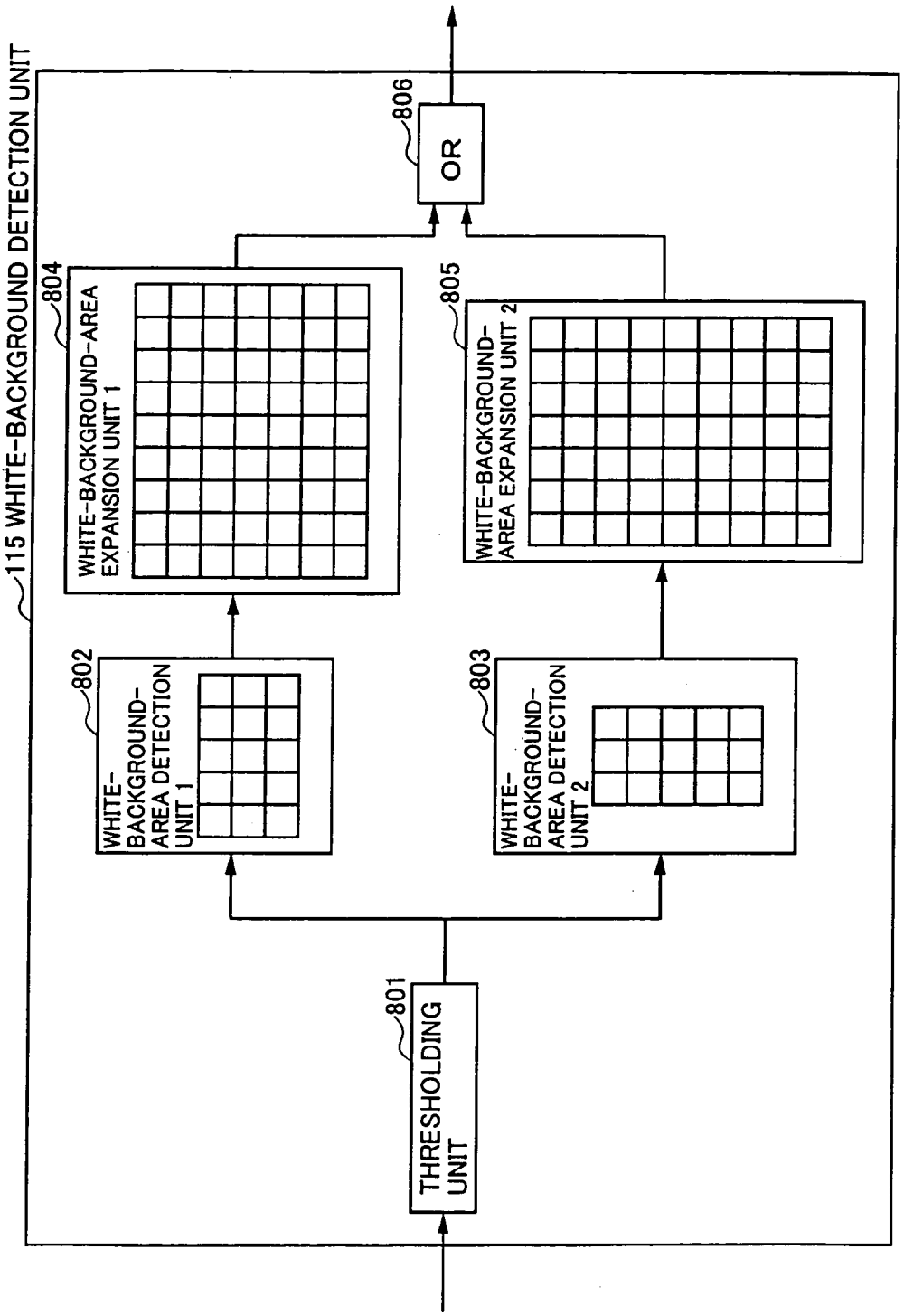
FIG. 10 is an illustrative drawing for explaining operation of a white-background detection unit.

FIG. 10 is an illustrative drawing for explaining operation of the white-background detection unit 115.

The white-background detection unit 115 includes a thresholding unit 801, a first white-background-area detection unit 802, a second white-background-area detection unit 803, a first white-background-area expansion unit 804, a second white-background-area expansion unit 805, and an OR unit 806.

The thresholding unit 801 receives image signals from the image input unit 101, and compares the image signals with a threshold on a pixel-by-pixel basis to obtain a binary image. In this thresholding operation, if an input value is smaller than or equal to the threshold, a white pixel (1) is assigned. If the input value is greater than the threshold, a black pixel (0) is assigned. The obtained binary data is supplied to the first white-background-area detection unit 802 and the second white-background-area detection unit 803. Each of the first white-background-area detection unit 802 and the second white-background-area detection unit 803 checks whether all pixels inside an area of interest are white pixels. If they are, this area is marked as a white-background area. (To be exact, a pixel at the center of this area is given a value indicative of a white-background area.) In this embodiment, the first white-background-area detection unit 802 checks a 5×3 rectangular area longer in the horizontal direction, and the second white-background-area detection unit 803 checks a 3×5 rectangular area longer in the vertical direction.

After this, the first white-background-area expansion unit 804 and the second white-background-area expansion unit 805 expand a 5×3 rectangular area and a 3×5 rectangular area marked as white-background areas by the first white-background-area detection unit 802 and the second white-background-area detection unit 803, respectively. This expansion operation expands white-background areas so as to cover boundary areas adjacent to the white-background areas when the boundary areas including letters and line drawings-cannot be detected as white-background areas by the first white-background-area detection unit 802 and the second white-background-area detection unit 803. In this embodiment, the first white-background-area expansion unit 804 expands a 5×3 pixel area by 2 pixels in all directions when the 5×3 pixel area is detected as a white-background area by the first white-background-area detection unit 802. A resulting area has a 9×7 pixel size. By the same token, the second white-background-area expansion unit 805 expands a 3×5 pixel area by 2 pixels in all directions when the 3×5 pixel area is detected as a white-background area by the second white-background-area detection unit 803. A resulting area has a 7×9 pixel size. The binary images in which the white-background areas are expanded by the white-background-area expansion units 804 and 805 are supplied to the OR unit 806, where an OR operation between the binary images is executed pixel-wise. Results of the OR operation are output as white-background-detection results to the edge-magnitude-conversion unit 116.

In the following, details of the edge-magnitude-conversion unit 116 will be described.

Figure 11:
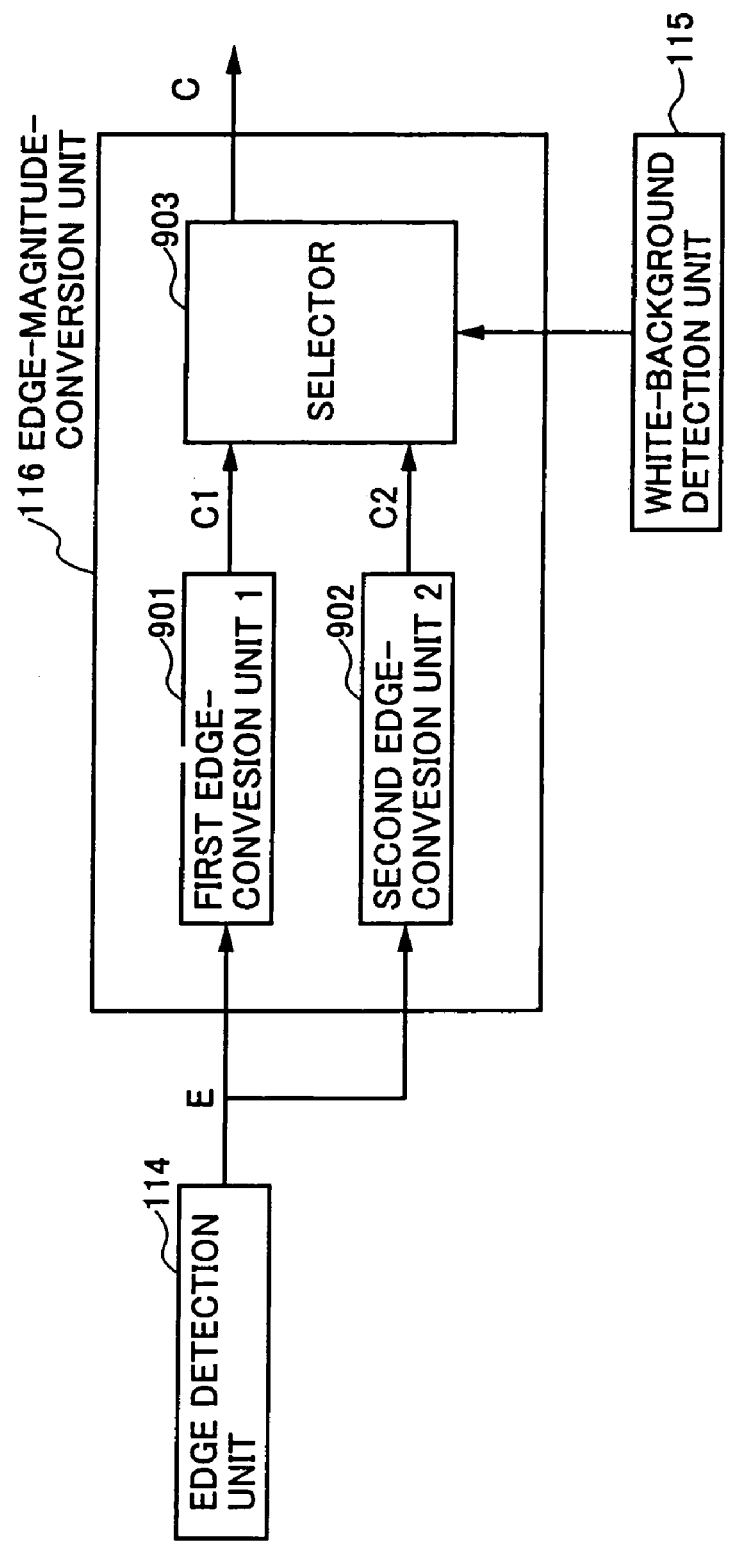
FIG. 11 is a block diagram showing a configuration of an edge-magnitude-conversion unit.

FIG. 11 is a block diagram showing a configuration of the edge-magnitude-conversion unit 116.

The edge magnitude E obtained by the edge detection unit 114 is converted into filter factors C1 and C2 by a first edge-conversion unit 901 and a second edge-conversion unit 902, respectively.

Figure 12:
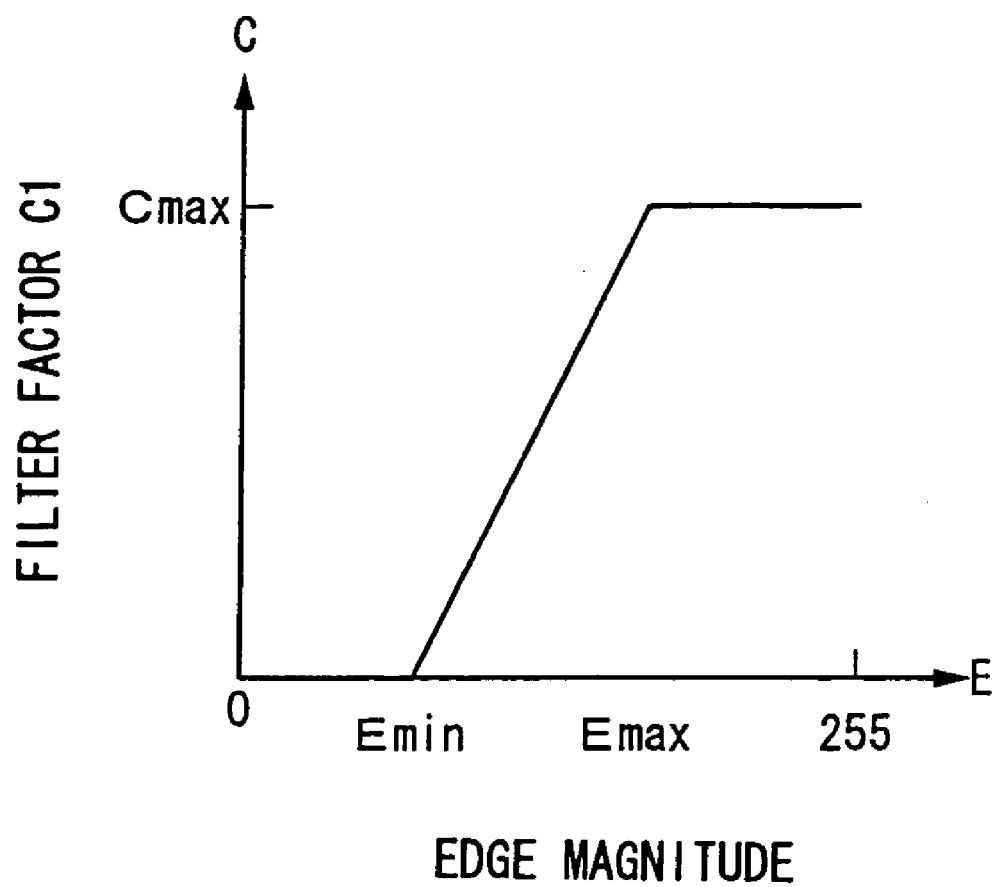
FIG. 12 is a chart showing a conversion characteristic of a first edge-conversion unit shown in FIG. 11.

FIG. 12 is a chart showing a conversion characteristic of the first edge-conversion unit 901. In FIG. 12, the horizontal axis represents a received edge magnitude E, and the vertical axis represents the filter factor C1. As shown in the figure, the filter factor C1 is set to zero when the edge magnitude E is smaller than Emin, and is set to a fixed factor Cmax when the edge magnitude E is larger than Emax. When the edge magnitude E is between Emin and Emax, the filter factor C1 linearly increases from zero to Cmax as the edge magnitude E moves from Emin to Emax.

Figure 13:
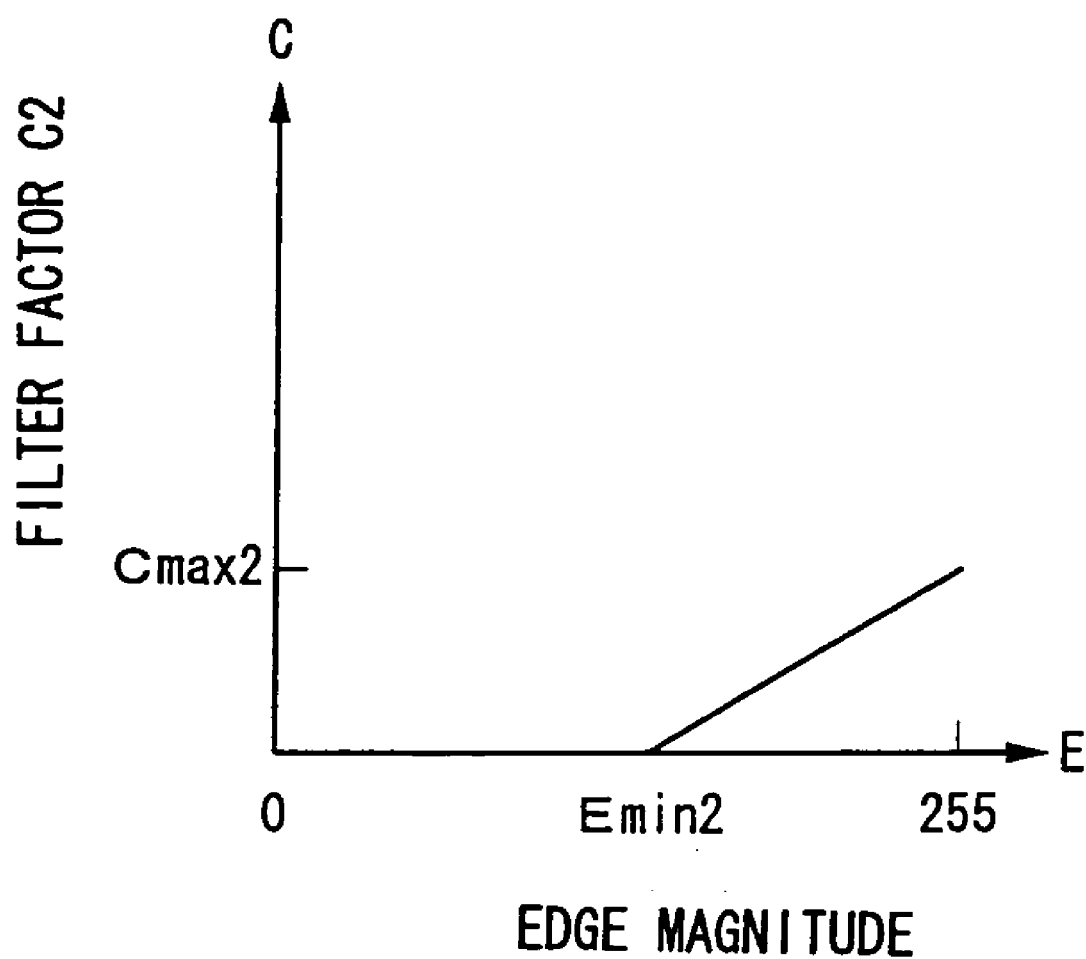
FIG. 13 is a chart showing a conversion characteristic of a second edge-conversion unit shown in FIG. 11.

FIG. 13 is a chart showing a conversion characteristic of the second edge-conversion unit 902. The conversion characteristic of the second edge-conversion unit 902 is defined such that the filter factor C2 is smaller than the filter factor C1 with respect to the same edge magnitude E. Emin2 is larger than Emin, and Cmax2 is smaller than Cmax.

The conversion characteristics of the first and second edge-conversion units 901 and 902 may be adjusted and determined while checking the results of filtering processes. This conversion-process may be performed by utilizing a table-look-up method, or may be performed by using a conversion equation.

With reference to FIG. 11 again, a selector 903 uses as a controlling factor the white-background-detection result of the white-background detection unit 115, and selects the filter factor C1 of the first edge-conversion unit 901 for a pixel in the white background areas and the filter factor C2 of the second edge-conversion unit 902 for a pixel in areas other than the white-background areas. This selection process is aimed at providing greater sharpness to edges in the white-background areas than to edges in the non-white-background areas.

Figure 14:
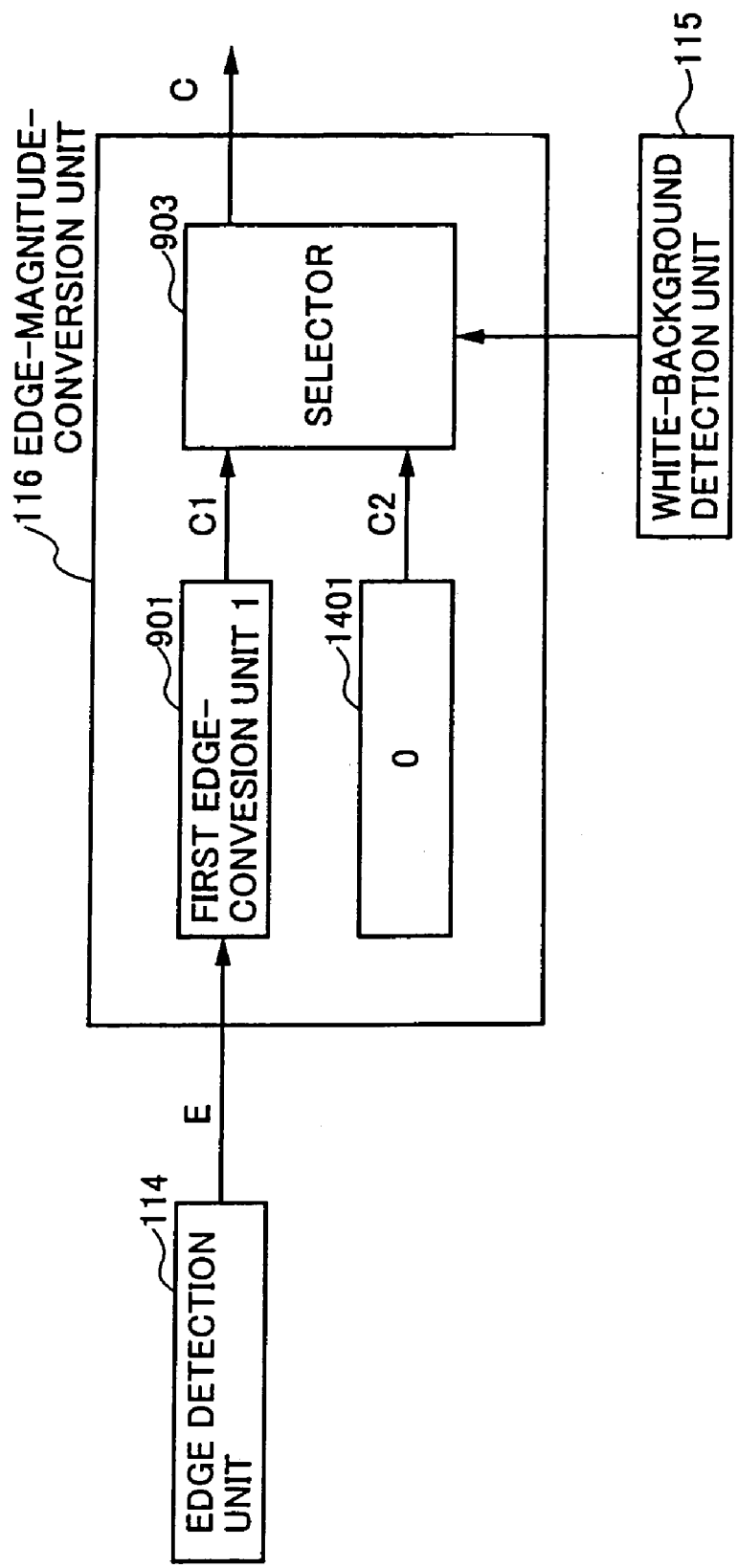
FIG. 14 is a block diagram of a variation of the edge-magnitude-conversion unit.

FIG. 14 is a block diagram of a variation of the edge-magnitude-conversion unit 116. In FIG. 14, the same elements as those of FIG. 11 are referred by the same numerals, and a description thereof will be omitted.

In FIG. 14, a unit 1401 is provided in place of the second edge-conversion unit 902, and supplies zero as the filter factor C2 to the selector 903 regardless of the edge magnitude E. This filter factor C2 that is zero is selected for the areas other than the white-background areas detected by the white-background detection unit 115. Other than this, the <Second Embodiment>

In the following, a second embodiment of the present invention will be described.

Figure 15:
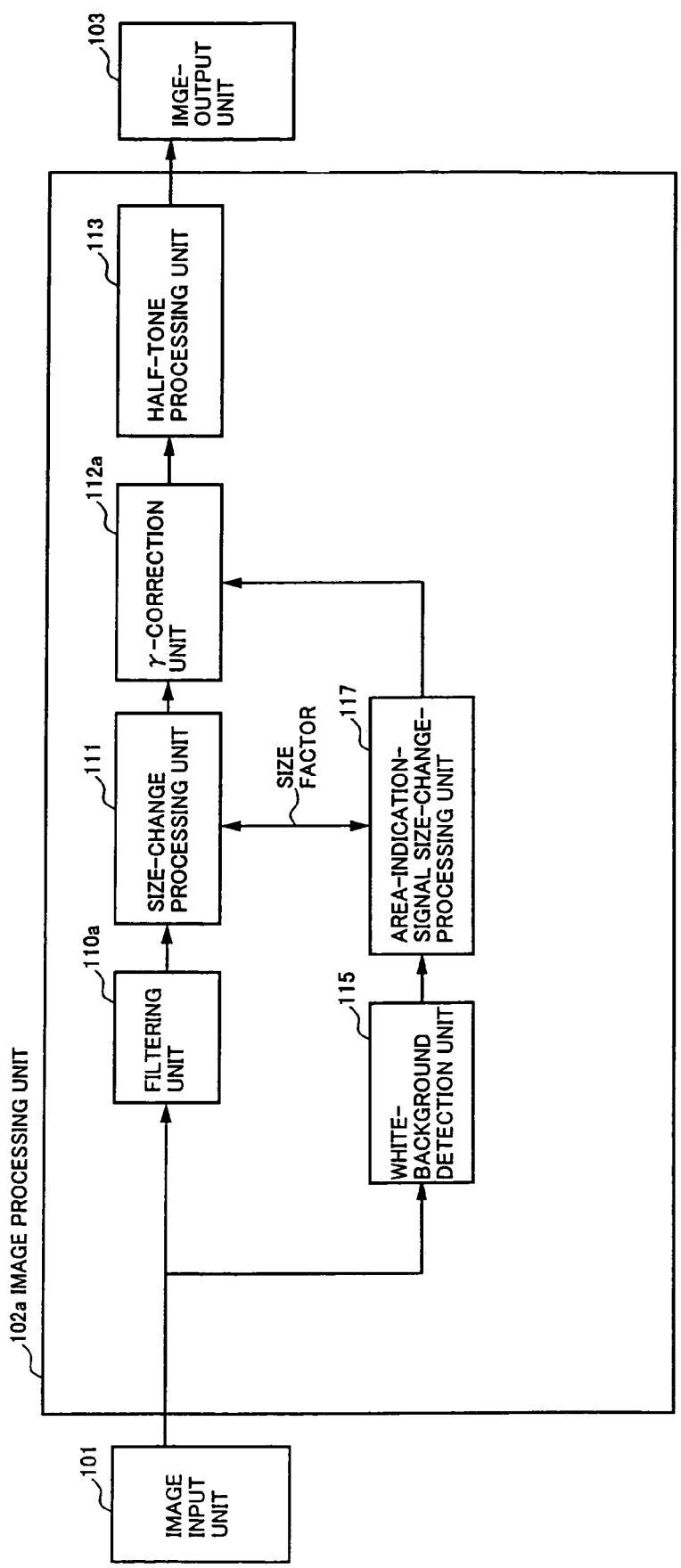
FIG. 15 is a block diagram of an image-processing device according to a second embodiment of the present invention.

FIG. 15 is a block diagram of an image-processing device according to a second embodiment of the present invention. In FIG. 15, the same elements as those of FIG. 1 are referred to by the same numerals.

In FIG. 15, the image input unit 101 reads original documents, and supplies digitized image signals to a filtering unit 110a and the white-background detection unit 115 of an image processing unit 102a. When the image signals are received from the image input unit 101, the filtering unit 110a transforms frequency characteristics of the image, and the size-change processing unit 111 enlarges or makes smaller image sizes according to a specified size-change factor by electrically processing image signals.

A gamma-correction unit 112a converts gray-level characteristics into desired gray-level characteristics with respect to a data path from the original image to the output image of the image-output unit 103. During this conversion, the gamma-correction characteristics are changed depending on whether areas are the white-background areas and the boundary areas thereof or other areas. The half-tone processing unit 113 attends to half-tone processing such as dither processing or error-diffusion processing in accordance with the image reproduction ability of the image-output unit 103, and supplies the processed signals to the image-output unit 103. The image-output unit 103 reproduces the image on a sheet of paper or the like.

In the image processing unit 102a, when the image signals are received from the image input unit 101, the white-background detection unit 115 detects white-background areas and boundary areas thereof. An area-indication-signal size-change-processing unit 117 enlarges or makes smaller image sizes of the area-indication signals electrically according to the indicated size-change factor of the size-change processing unit 111. The gamma-correction unit 112a applies different gray-level corrections to different areas in accordance with the area-detection results, depending on whether these areas are the white-background and boundary areas or the other areas.

Figure 16:
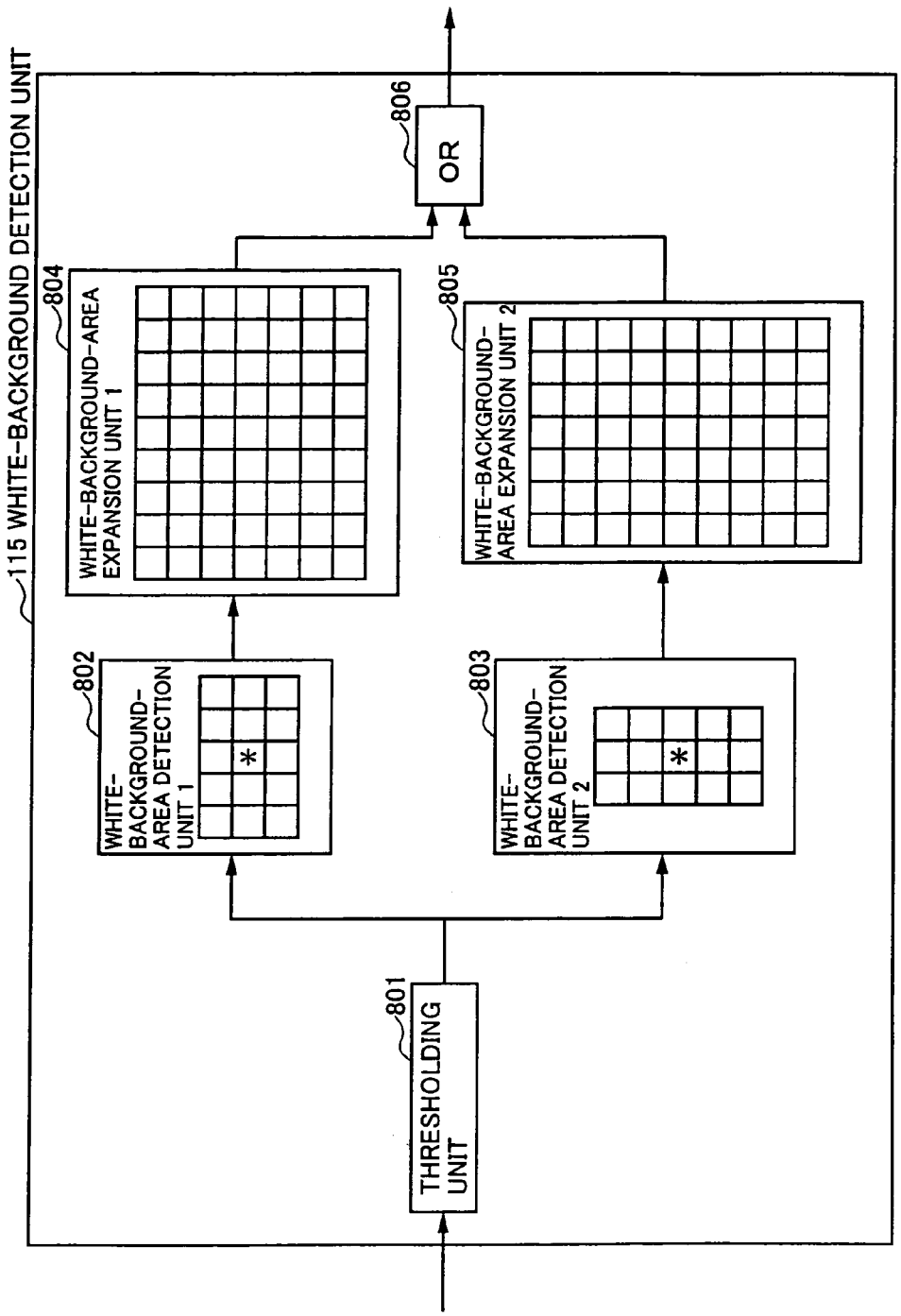
FIG. 16 is a block diagram showing a configuration of a white-background detection unit.

FIG. 16 is a block diagram showing a configuration of the white-background detection unit 115.

As shown in FIG. 16, the white-background detection unit 115 has the same configuration as that of the first embodiment shown in FIG. 10. The thresholding unit 801 receives image signals from the image input unit 101, and compares the image signals with a threshold on a pixel-by-pixel basis to obtain a binary image. In this thresholding operation, if an input value is smaller than or equal to the threshold, a white pixel (1) is assigned. If the input value is greater than the threshold, a black pixel (0) is assigned. The obtained binary data is supplied to the first white-background-area detection unit 802 and the second white-background-area detection unit 803. Each of the first white-background-area detection unit 802 and the second white-background-area detection unit 803 checks whether all pixels inside an area of interest are white pixels. If they are, this area is marked as a white-background area. (To be exact, a pixel at the center of this area is given a value indicative of a white-background area.) In this embodiment, the first white-background-area detection unit 802 checks a 5×3 rectangular area longer in the horizontal direction, and the second white-background-area detection unit 803 checks a 3×5 rectangular area longer in the vertical direction.

After this, the first white-background-area expansion unit 804 and the second white-background-area expansion unit 805 expand a 5×3 rectangular area and a 3×5 rectangular area marked as white-background areas by the first white-background-area detection unit 802 and the second white-background-area detection unit 803, respectively. This expansion operation expands white-background areas so as to cover boundary areas adjacent to the white-background areas when the boundary areas including letters and line drawings cannot be detected as white-background areas by the first white-background-area detection unit 802 and the second white-background-area detection unit 803. In this embodiment, the first white-background-area expansion unit 804 expands a 5×3 pixel area by 2 pixels in all directions when the 5×3 pixel area is detected as a white-background area by the first white-background-area detection unit 802. A resulting area has a 9×7 pixel size. By the same token, the second white-background-area expansion unit 805 expands a 3×5 pixel area by 2 pixels in all directions when the 3×5 pixel area is detected as a white-background area by the second white-background-area detection unit 803. A resulting area has a 7×9 pixel size. The binary images in which the white-background areas are expanded by the white-background-area expansion units 804 and 805 are supplied to the OR unit 806, where an OR operation between the binary images is executed pixel-wise. Results of the OR operation are output as white-background-detection results to the area-indication-signal size-change-processing unit 117.

Figure 17:
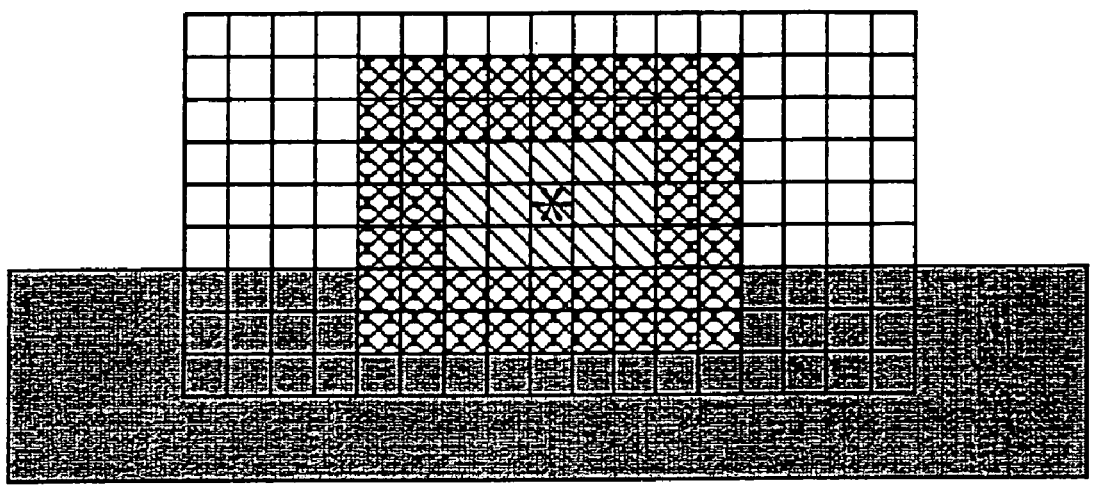
FIG. 17 is an illustrative drawing for explaining operation of the white-background detection unit.

FIG. 17 is an illustrative drawing for explaining operation of the white-background detection unit 115.

FIG. 17 shows image processing corresponding to the 9×7 pixel window of the first white-background-area expansion unit 804. In the figure, the symbol "*" indicates a pixel of a current interest, and a check is made whither the 5×3 pixel area surrounding this pixel is a white-background area. In an example of FIG. 17, all the pixels inside this pixel area are white pixels, so that the area is expanded by 2 pixels in all directions to generate a 9×7 pixel area. As shown in FIG. 17, the generated 9×7 pixel area erodes black-pixel areas of the binary image by 2 pixels after the binary image is generated by the thresholding operation. In this embodiment, the white-background-area detection units 802 and 803 mark checked areas as white-background areas when all the pixels within the checked areas are white pixels. Alternatively, thresholding may be used in this decision making process. For example, a checked area may be marked as a white-background area if more than 13 pixels are white pixels in this 5×3 checked area.

Figure 18:
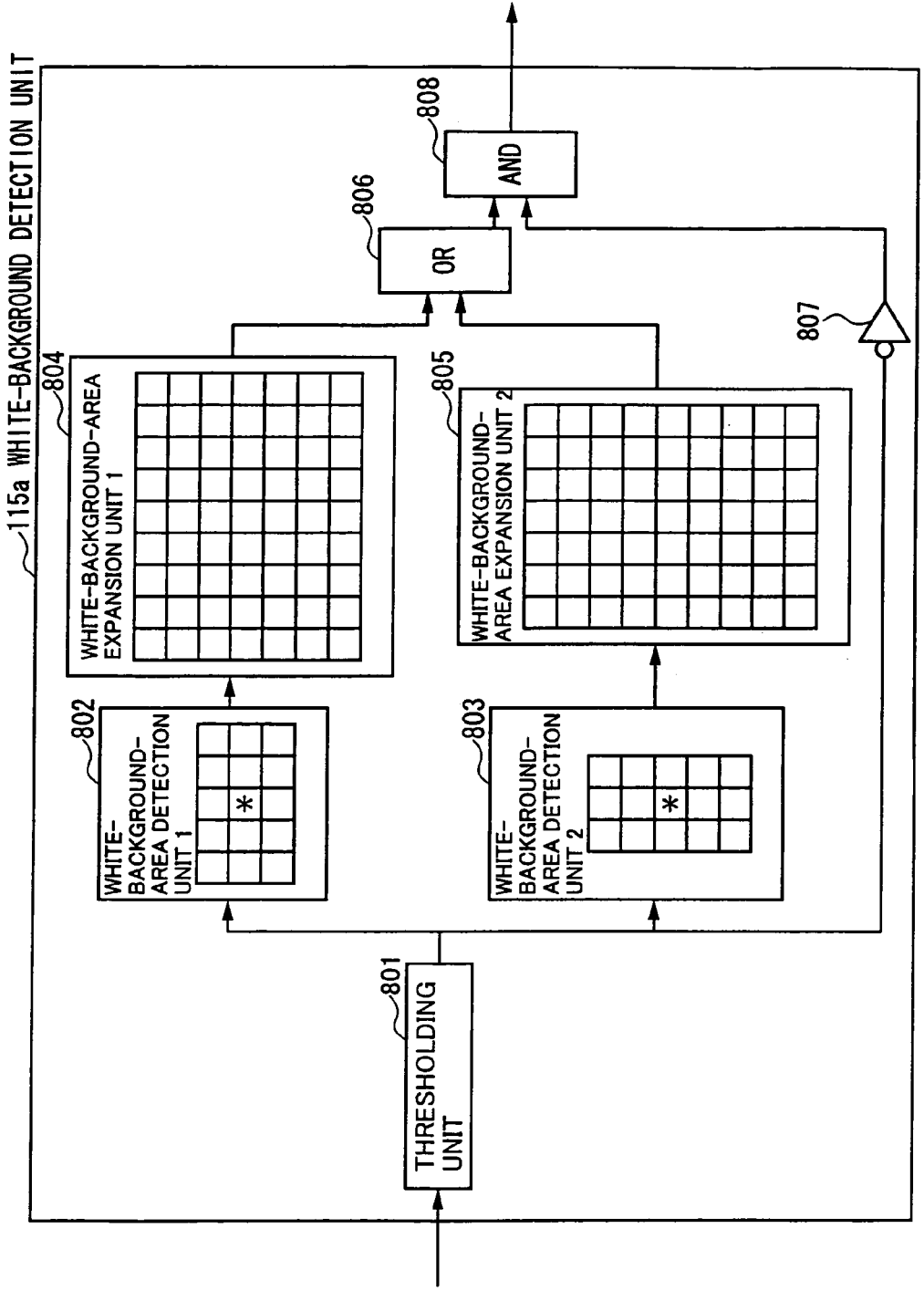
FIG. 18 is an illustrative drawing showing a variation of the white-background detection unit.

FIG. 18 is an illustrative drawing showing a variation of the white-background detection unit.

A white-background detection unit 115a of FIG. 18 has an inverter 807 and an AND gate 808 newly provided in addition to the configuration of the white-background detection unit 115 of FIG. 16. In this configuration, a logical AND operation is performed between the results of white-background detection and an inversion of the binary image obtained by the thresholding. This makes it possible to detect only the boundary areas by excluding the white background areas from the results of white-background detection.

Figure 19:
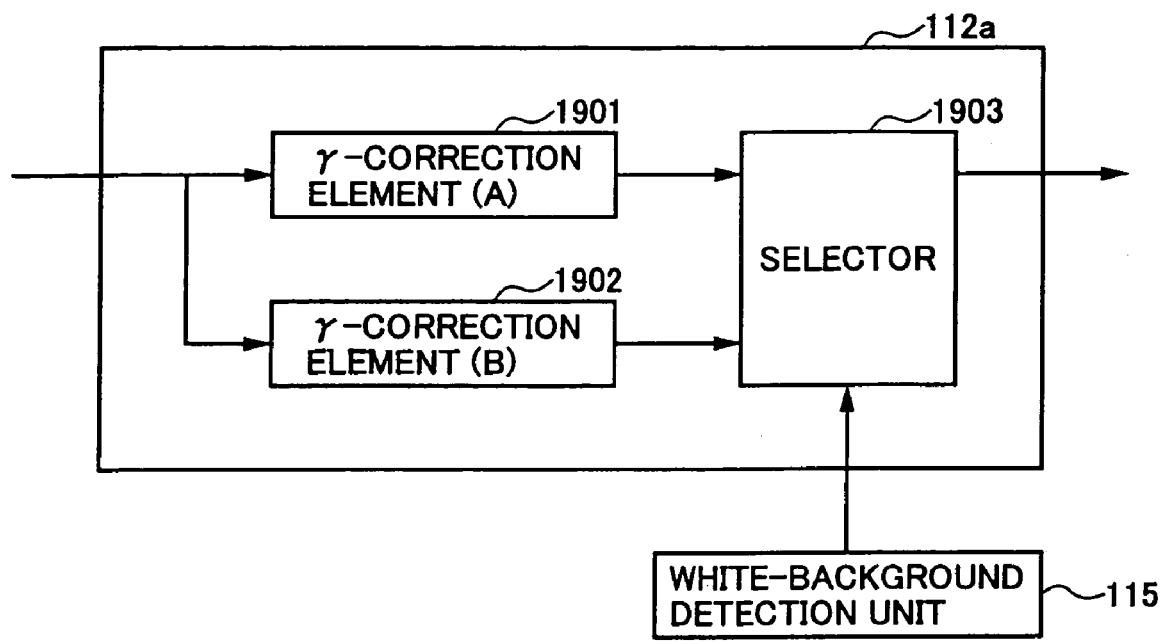
FIG. 19 is a block diagram of a gamma-correction unit.

FIG. 19 is a block diagram of the gamma-correction unit 112a.

The gamma-correction unit 112a includes a first gamma-correction element 1901, a second gamma-correction element 1902, and a selector 1903. The first gamma-correction element 1901 and the second gamma-correction element 1902 have different gray-level conversion characteristics. The selector 1903 selects the output of the second gamma-correction element 1902 for the white-background areas and the boundary areas according to the detection results supplied from the white-background detection unit 115, and selects the output of the first gamma-correction element 1901 for areas other than the white-background and boundary areas.

Figure 20:
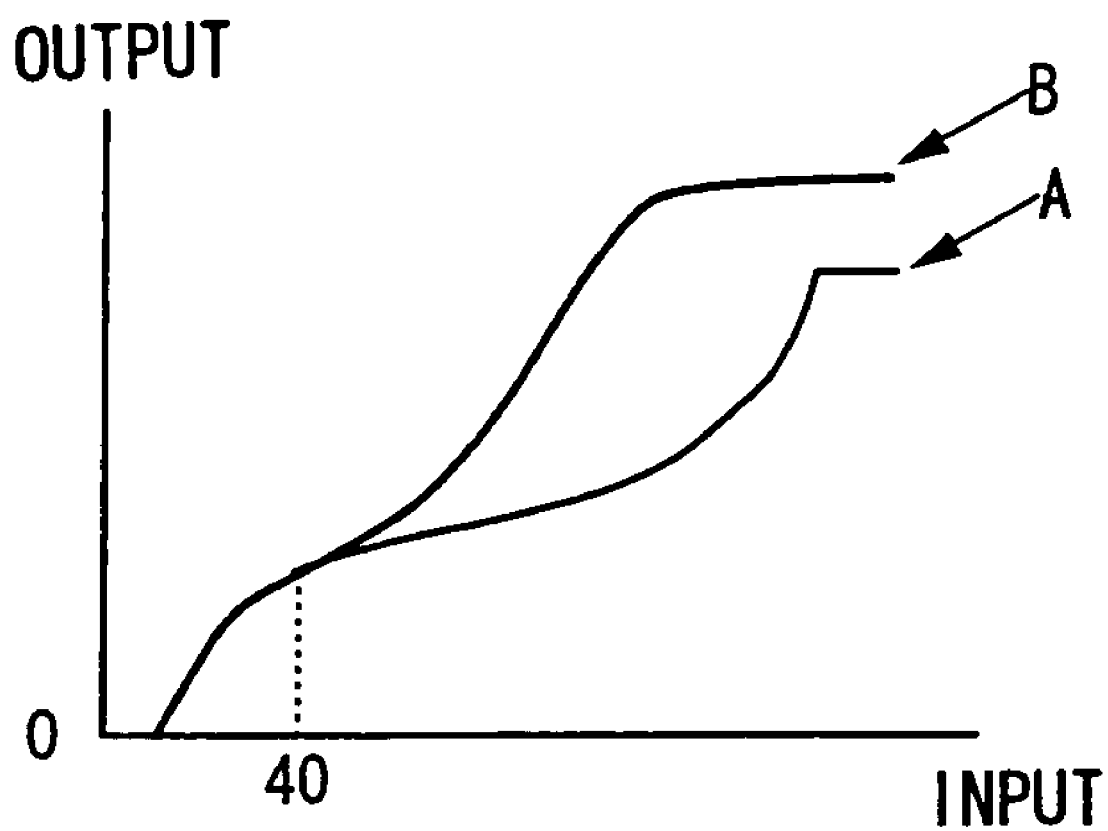
FIG. 20 is a chart showing the gray-level-conversion characteristics of the first gamma-correction element and the second gamma-correction element shown in FIG. 19.

FIG. 20 is a chart showing the gray-level conversion characteristics of the first gamma-correction element 1901 and the second gamma-correction element 1902. In FIG. 20, the gray-level conversion characteristic A is that of the first gamma-correction element 1901, and the gray-level conversion characteristic B is that of the second gamma-correction element 1902. The gray-level conversion characteristic B outputs a greater value than the gray-level conversion characteristic A in an input-gray-level range above an input gray level of 40.

In this manner, the two gamma-correction characteristics A and B are provided, wherein the gray-level conversion characteristic B is used for gamma correction by selecting the output of the second gamma-correction element 1902 for the boundary areas or the white-background and boundary areas, and the gray-level conversion characteristic A is used for gamma correction by selecting the output of the first gamma-correction element 1901 for the non-white-background areas. Such selective switching of gray-level conversion characteristics for different image areas makes it possible to improve reproduction quality and legibility of letters on the white backgrounds while maintaining the high quality of tone representation in picture areas such as mesh-dot-image areas or continuous-tone-image areas.

The gray-level conversion characteristic B, which is applied to the white-background areas and the boundary areas, is configured such to output a greater value than the other gray-level conversion characteristic used for the other areas, and such is the case at least in a gray-level range above middle gray levels. Because of this configuration, reproduction quality and legibility of letters on the white background can be improved. Gray level ranges below middle gray levels do not affect reproduction quality to the noticeable extent, so that the gray-level conversion characteristic B may be set to the same curve as the gray-level conversion characteristic A, or may even be set smaller than the gray-level conversion characteristic A. In the latter case, smear-like artifacts on the white background can be suppressed. In the present invention, general background areas are referred to as white-background areas. However, the present invention is not limited to a case in which the background level is exactly at a gray level of 0. Depending on the background gray levels, the threshold used by the thresholding unit 801 is set to an appropriate value so as to produce the same results as described heretofore. Namely, the present invention does not limit backgrounds to the white background.

The number of pixels expanded in the white-background-area expansion units 804 and 805 has an optimum number with respect to input-image resolution. When the number of expanded pixels is small, the size of erosion of boundary areas by white backgrounds is relatively small, resulting in the effect of the gamma-correction unit 112a being compromised. When the number of expanded pixels is large, the size of erosion of boundary areas by white backgrounds becomes too large. In this case, half-tone picture areas adjacent to the white backgrounds end up having appearance that these areas are framed, resulting in poor picture quality. Expansion by two pixels may be appropriate for images when they are scanned at 600 dpi. Expansion by one pixel may be proper when images are scanned at 300 dpi.

Figure 21:
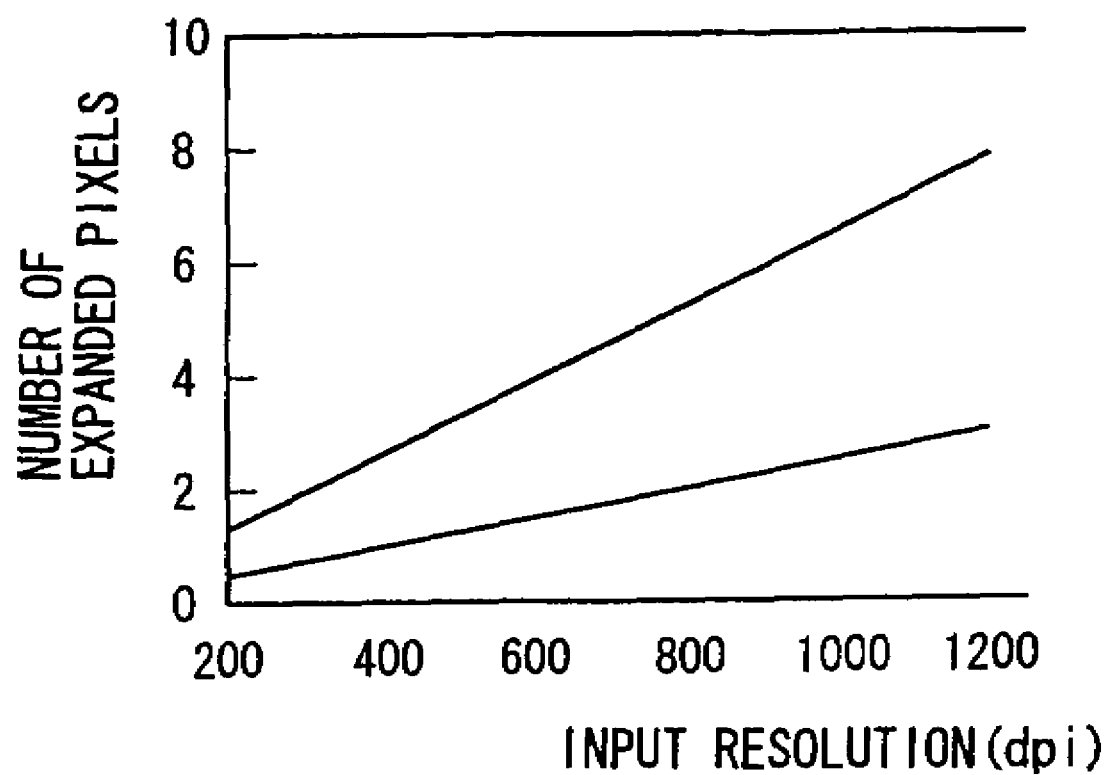
FIG. 21 is a chart showing a proper range of the number of expanded pixels with respect to image resolution.

FIG. 21 is a chart showing a proper range of the number of expanded pixels with respect to image resolution.

In FIG. 21, two lines indicate an upper limit and a lower limit of a proper range of the number of expanded pixels. When this range is expressed, it would be represented as:

$$150 < (\text{input resolution dpi})/(\text{number of expanded pixel}) < 400$$

Setting area expansion within a proper range insures that images of optimum image quality are obtained.

Figure 22:
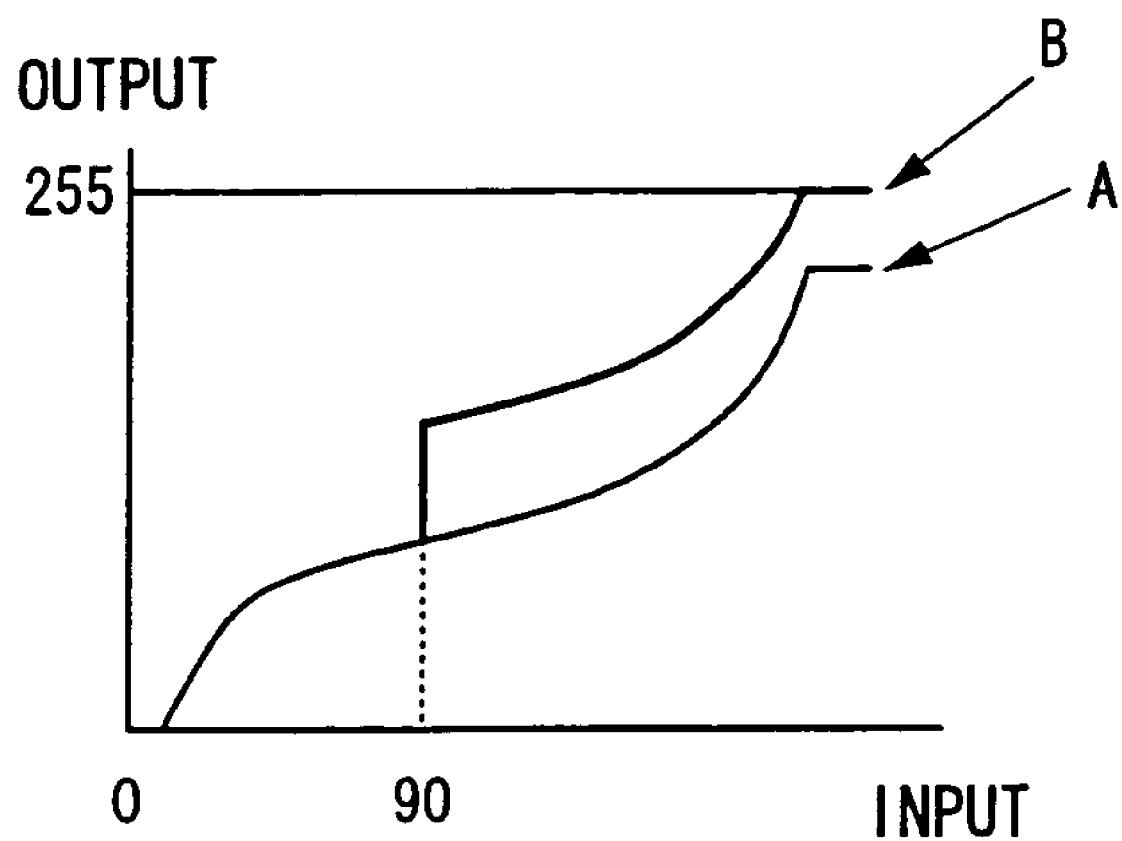
FIG. 22 is a chart showing variations of the gray-level-conversion characteristics.

FIG. 22 is a chart showing variations of the gray-level conversion characteristics A and B. The gray-level conversion characteristic B is applied to white-background areas and boundary areas thereof, and the gray-level conversion characteristic A is applied to other areas. In FIG. 22, the characteristic curve B is so configured as to produce an output greater than the characteristic curve A by a predetermined constant level when the gray level exceeds a predetermined level (=90). This configuration maintains proper gray-level characteristics with respect to white-background areas and boundary areas thereof, so that letters with gray-level gradation are properly reproduced while improving reproduction quality and legibility of the letters on the white backgrounds.

Figure 23:
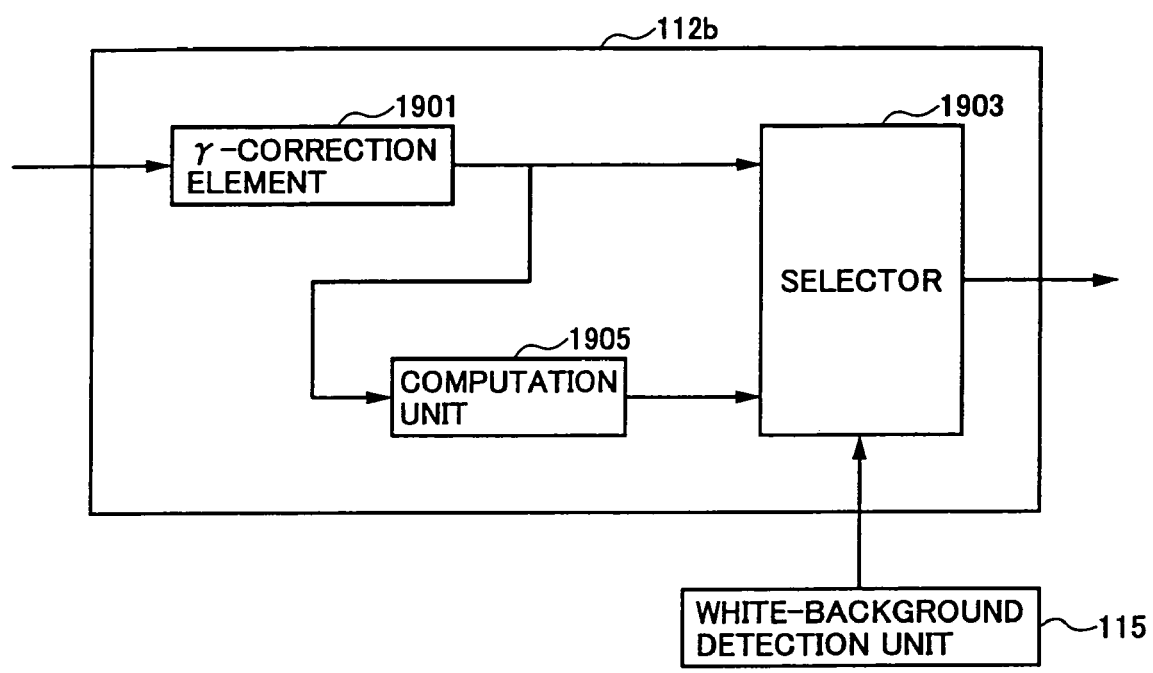
FIG. 23 is a block diagram of a gamma-correction unit that implements the characteristic curves shown in FIG. 22.

FIG. 23 is a block diagram of a gamma-correction unit 112 that implements the characteristic curves shown in FIG. 22.

In FIG. 23, a computation unit 1905 is provided to generate the gray-level conversion characteristic B by using the gray-level conversion characteristic A as a base curve.

Figure 24:
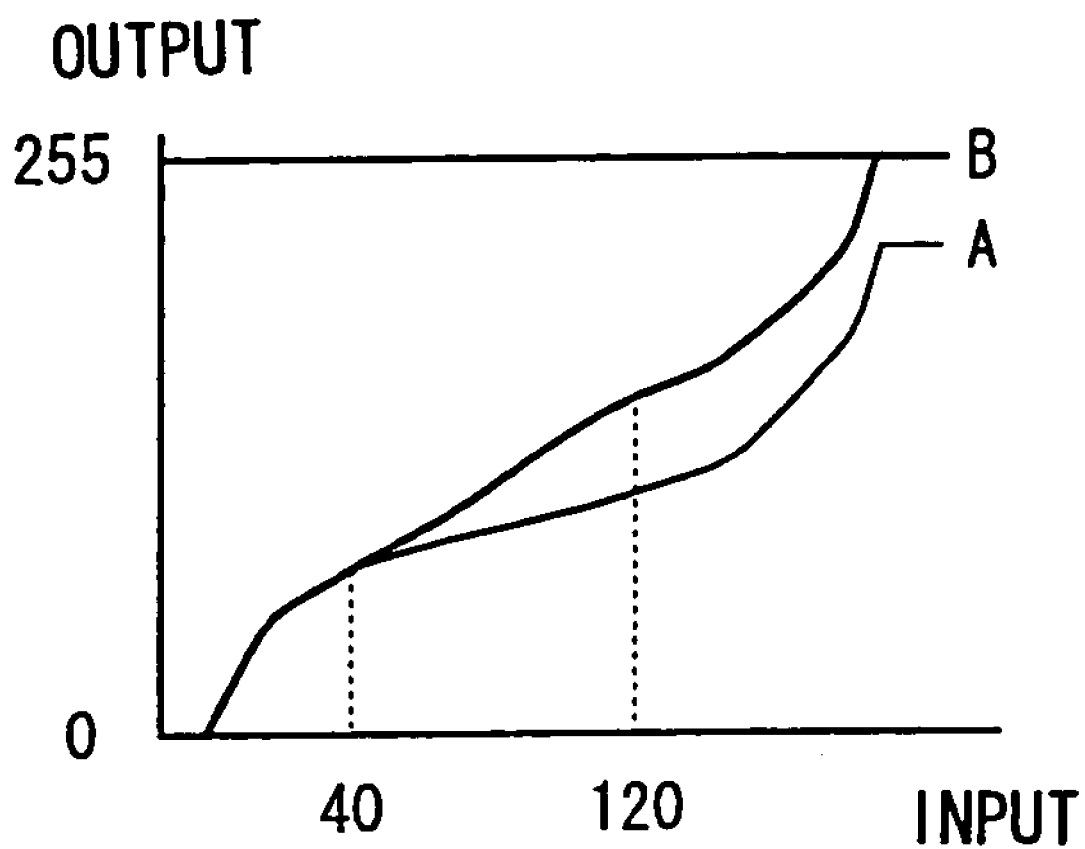
FIG. 24 is a chart showing another variation of the gray-level conversion characteristics.

FIG. 24 is a chart showing another variation of the gray-level conversion characteristics A and B.

As shown in FIG. 24, the level shift of the gray-level conversion characteristic B deviating from the gray-level conversion characteristic A may be implemented as a gradual shift. Such a shift eliminates a sharp gray-level jump, thereby facilitating high-quality image reproduction. In FIG. 24, a gradual level shift is provided between the input gray level 40 and the input gray level 120.

Figure 25:
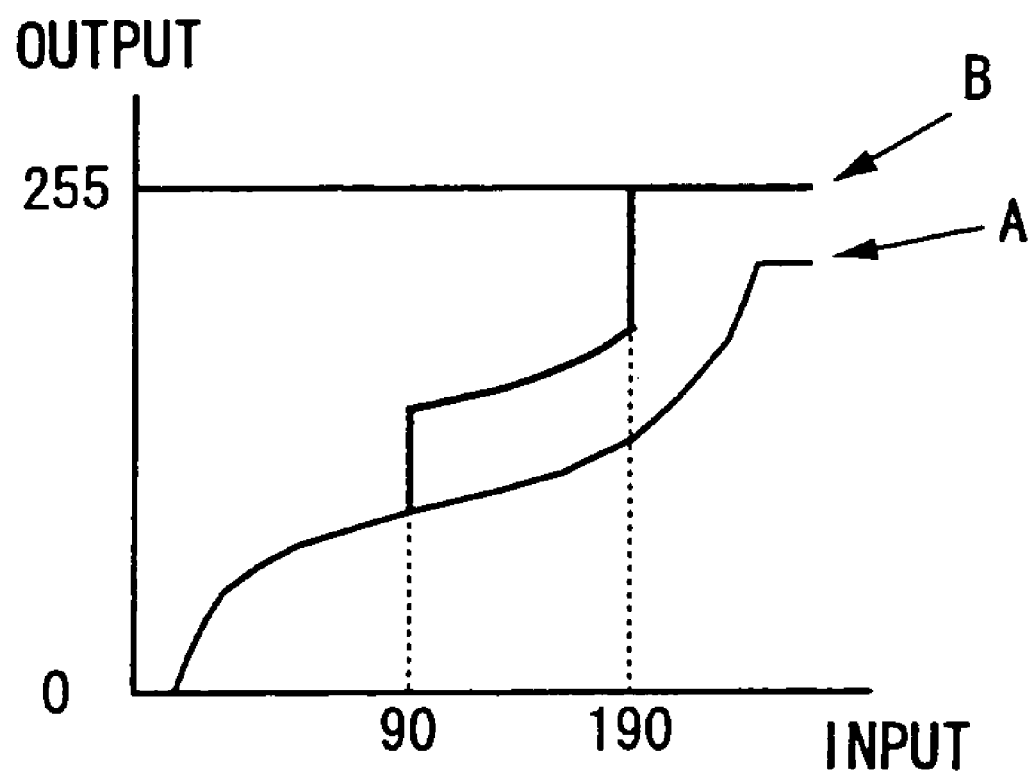
FIG. 25 is a chart showing a further variation of the gray-level conversion characteristics.

FIG. 25 is a chart showing a further variation of the gray-level conversion characteristics A and B.

In FIG. 25, the gray-level conversion characteristic B applied to white-background areas and boundary areas thereof is configured such as to produce a maximum gray level (i.e., 255 in the case of 8-bit image data) when an input gray level exceeds a predetermined level such as 190. Such a configuration further improves legibility of letters on the white-background areas.

In the following, a variation of the second embodiment will be described.

In FIG. 15, area detection is carried out with respect to raw image signals such as those provided directly from a scanning device without having frequency characteristics thereof converted.

Figure 26:
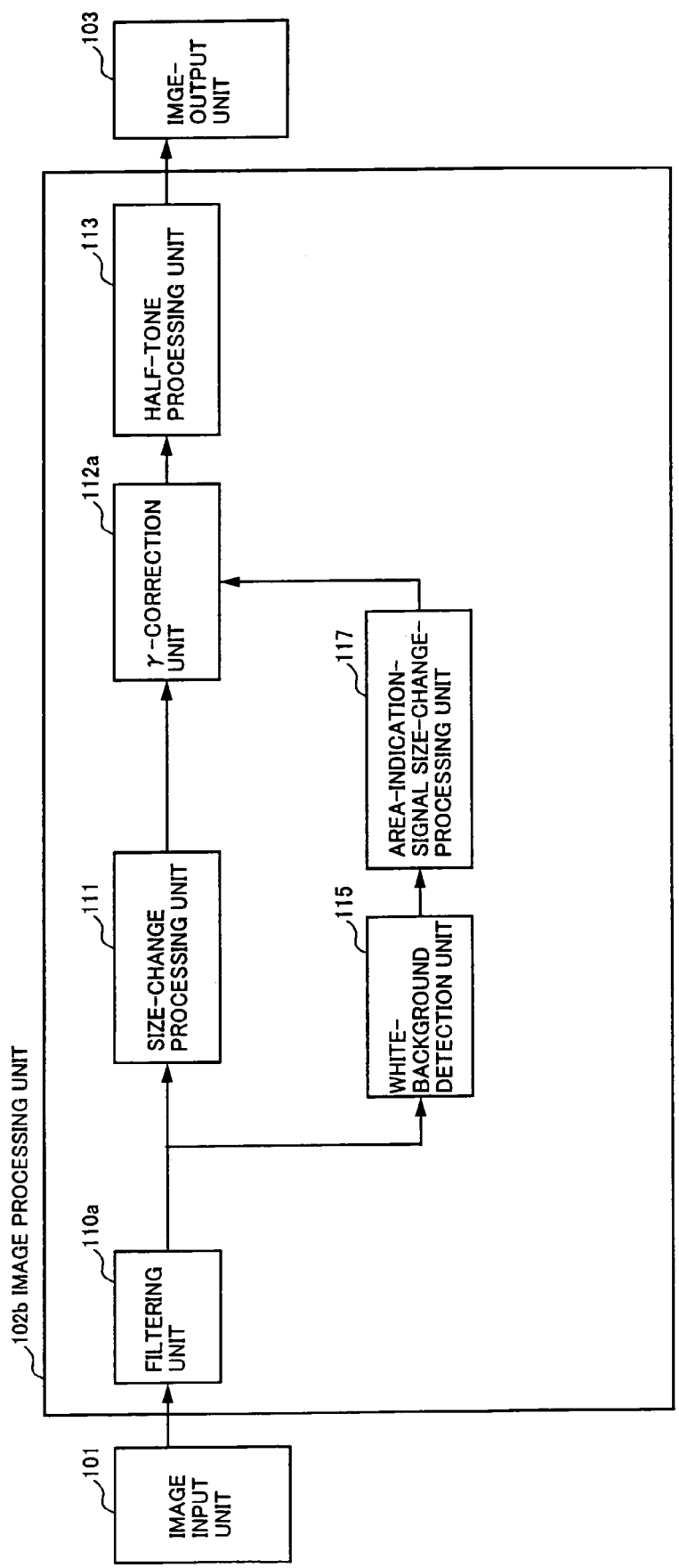
FIG. 26 is a block diagram of an image-processing device according to a variation of the second embodiment of the present invention.

FIG. 26 is a block diagram of an image-processing device according to a variation of the second embodiment of the present invention.

FIG. 26 shows an image processing unit 102b in which the filtering unit 110a applies filtering processes to the image signals, and the area detection is carried out with respect to the filtered image signals. In this configuration, the filtering unit 110a may be comprised of a filter having such frequency characteristics as to smooth isolated dots, for example.

FIG. 27 is an illustrative drawing showing an example of a filter configuration of the filtering unit 110a shown in FIG. 26. FIG. 28 is an illustrative drawing showing another example of a filter configuration of the filtering unit 110a shown in FIG. 26.

The filtering unit 110a may be comprised of a 3×3 smoothing filter as shown in FIG. 28. In order to secure quality of letters, however, a band-enhancement filter that smoothes high frequency components as shown in FIG. 27 may be more preferable. Use of this filter insures that isolated dots are smoothed through filtering processes, so that thresholding by the white-background detection unit 115 can avoid detecting isolated dots as non-white-background areas when these isolated dots are generated by noise or fine dirt on white backgrounds. This improves quality of white-background detection, and facilitates higher image quality.

Figure 29:
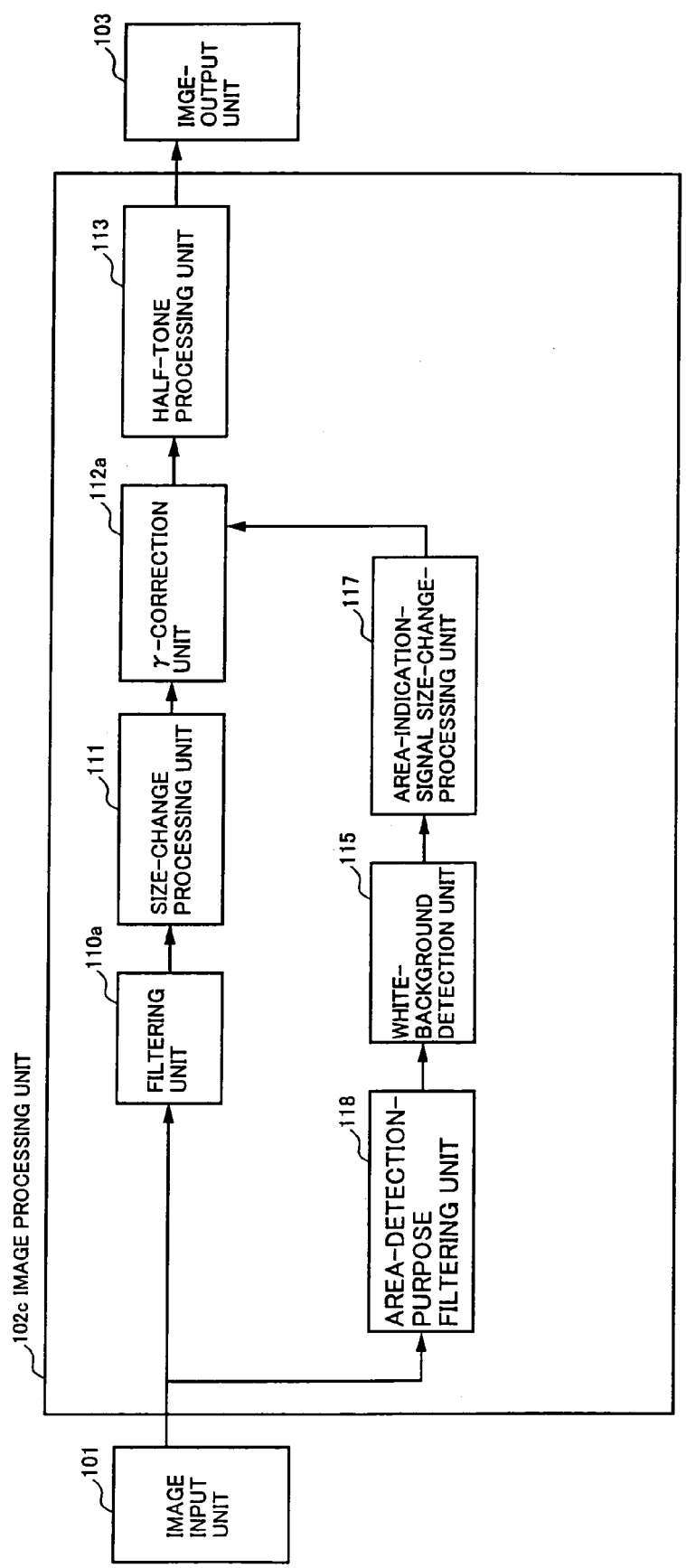
FIG. 29 is a block diagram of an image-processing device according to another variation of the second embodiment of the present invention.

FIG. 29 is a block diagram of an image-processing device according to another variation of the second embodiment of the present invention.

Figure 30:
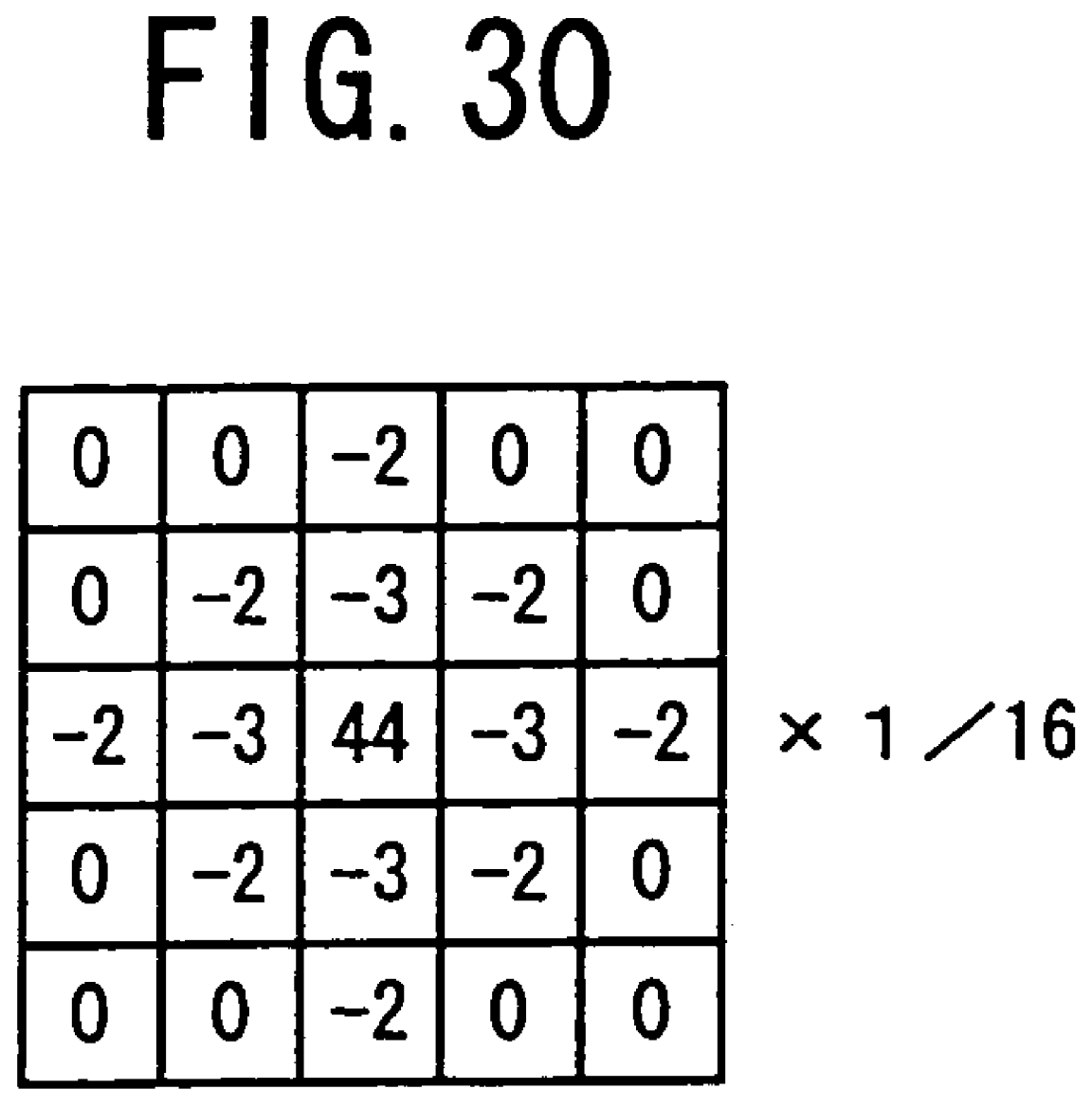

AS shown in an image processing unit 102c of FIG. 29, an area-detection-purpose filtering unit 118 may be provided separately from the filtering unit 110a, so that image signals processed by the area-detection-purpose filtering unit 118 are used in area-detection processing. This configuration makes it possible to define filters for area detection independently of filters for image-signal reproduction, providing greater latitude in setting of filter coefficients. The filtering unit 110a for image-signal reproduction may be comprised of a filter as shown in FIG. 30, and the area-detection-purpose filtering unit 118 may be comprised of the filter as shown in FIG. 28. Such a combination provides a basis for finer image reproduction. Alternately, image processing that removes isolated dots rather than simply smoothing out these dots through filtering processes may be applied before area detection is performed. This can produce the same advantages as described above.

Figure 31:
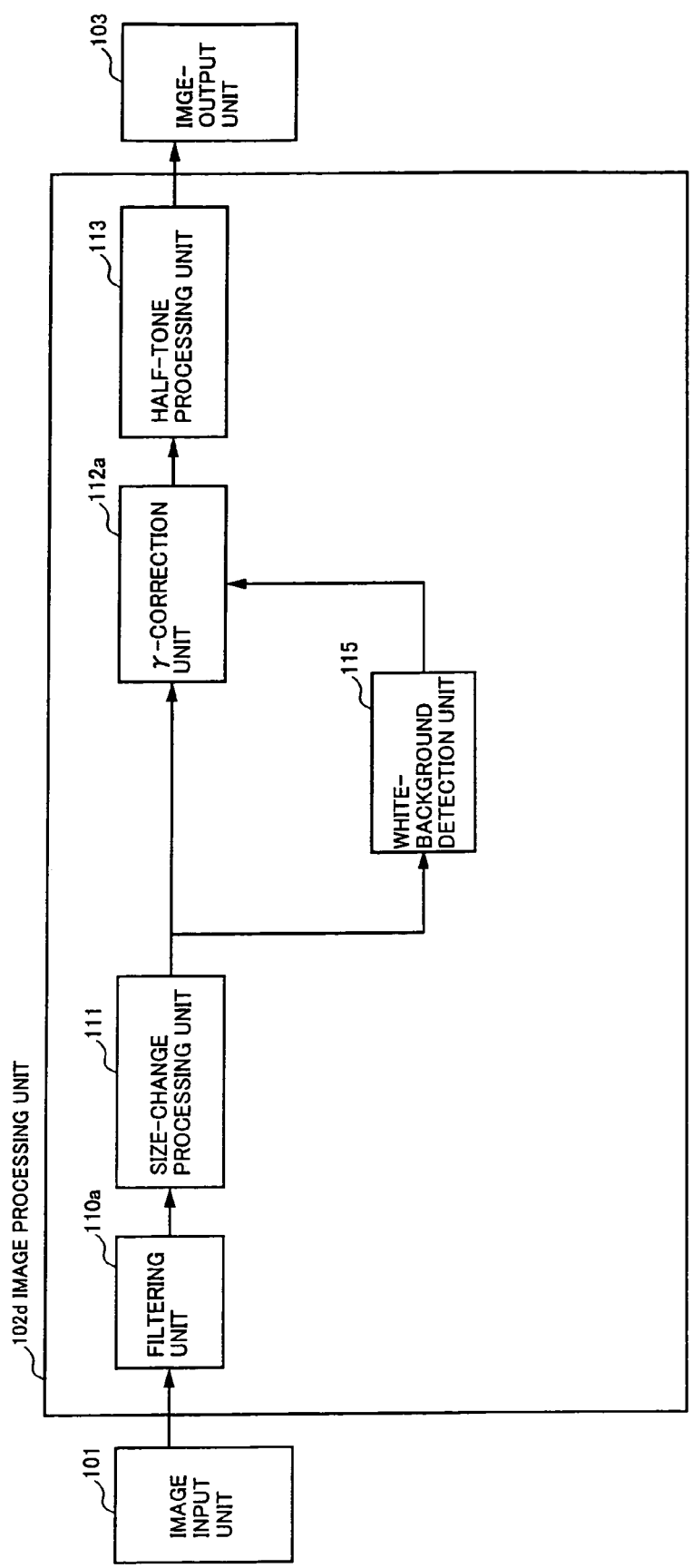
FIG. 31 is a block diagram of an image-processing device according to another variation of the second embodiment of the present invention.

FIG. 31 is a block diagram of an image-processing device according to another variation of the second embodiment of the present invention.

In an image processing unit 102d of FIG. 31, the white-background detection unit 115 performs area detection processes on the signals that have already gone through size-change processing. This configuration eliminates a need for the size-change processing for area-detection results, i.e., eliminates a need for the area-indication-signal size-change-processing unit 117 shown in FIG. 15. Cost reduction can thus be achieved.

Figure 32:
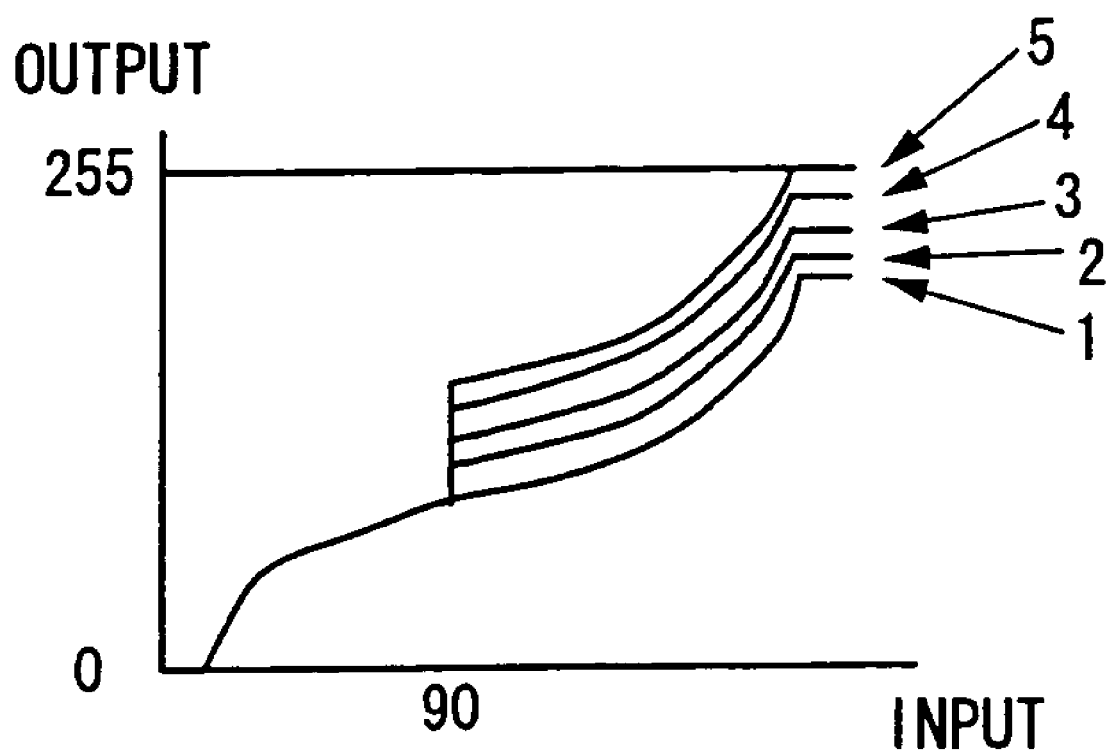
FIG. 32 is a chart showing a plurality of gamma-correction characteristics that are provided for user selection.

FIG. 32 is a chart showing a plurality of gamma-correction characteristics that are provided for a user to select.

For example, an operation panel of a device has letter-gray-level setting buttons, allowing a user to make settings to letter gray levels on the white backgrounds by selecting one of the five different gray levels, for example. In response, the device uses the gray-level conversion characteristic that corresponds to the selected gray level. For example, when a gray level 5 (darkest) is selected, a gray-level characteristic 5 shown in FIG. 32 is chosen, and when a gray level 1 (lightest) is indicated, a gray-level characteristic 1 shown in FIG. 32 is selected.

Figure 33:
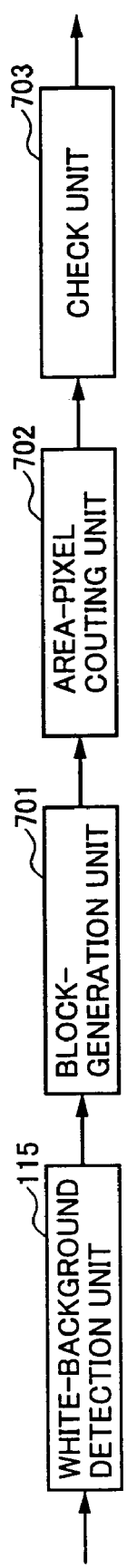
FIG. 33 is a block diagram showing a configuration of an area-detection unit.

FIG. 33 is a block diagram showing another configuration of an area-detection unit. As shown in FIG. 33, a block-generation unit 701 receives detection results from the white-background detection unit 115, and divides the detection results into a plurality of blocks having a predetermined block size. An area-pixel counting unit 702 counts the number of white-background pixels within each block. A check unit 703 marks a given block as a white-background area if the number of white-background pixels exceeds a predetermined number. This configuration can reduce data size of the white-background data, thereby making efficient use of the memory volumes. Further, if the blocks are designed to have a square shape, image rotation by 90, etc., can be easily handled.

<Third Embodiment>

In the first and second embodiments, a binary-wise check is made to decide whether an area of interest is a white-background area or non-white-background area, and a two-way choice is made with respect to processing characteristics of filtering processes and conversion characteristics of gamma correction. Namely, a check is made in a binary manner to decide whether a given area is a white-background area or a non-white-background area, ignoring grayness between white and black as to how close to white a given area is in terms of whiteness thereof. Such binary-wise processing tends to lack sufficient stability. For example, if a single pixel is marked as a white-background area in areas where all pixels should be marked as non-white-background areas, then, the white-background area is expanded around this single pixel, thereby creating a white-background area having a substantial area size.

In consideration of this, a third embodiment of the present invention detects a degree of white background likeliness that indicates how likely an area of interest is to be a white-background area. Based on the degree of white-background likeliness, processing characteristics of filter processes are controlled. The degree of white-background likeliness is not a binary value assuming either 0 or 1, but assumes one of a plurality of values on a continuous scale from a minimum to a maximum (e.g., 0 to 1). In response, selection from a plurality of filter characteristics can be made rather than a choice between only two alternative characteristics.

Figure 34:
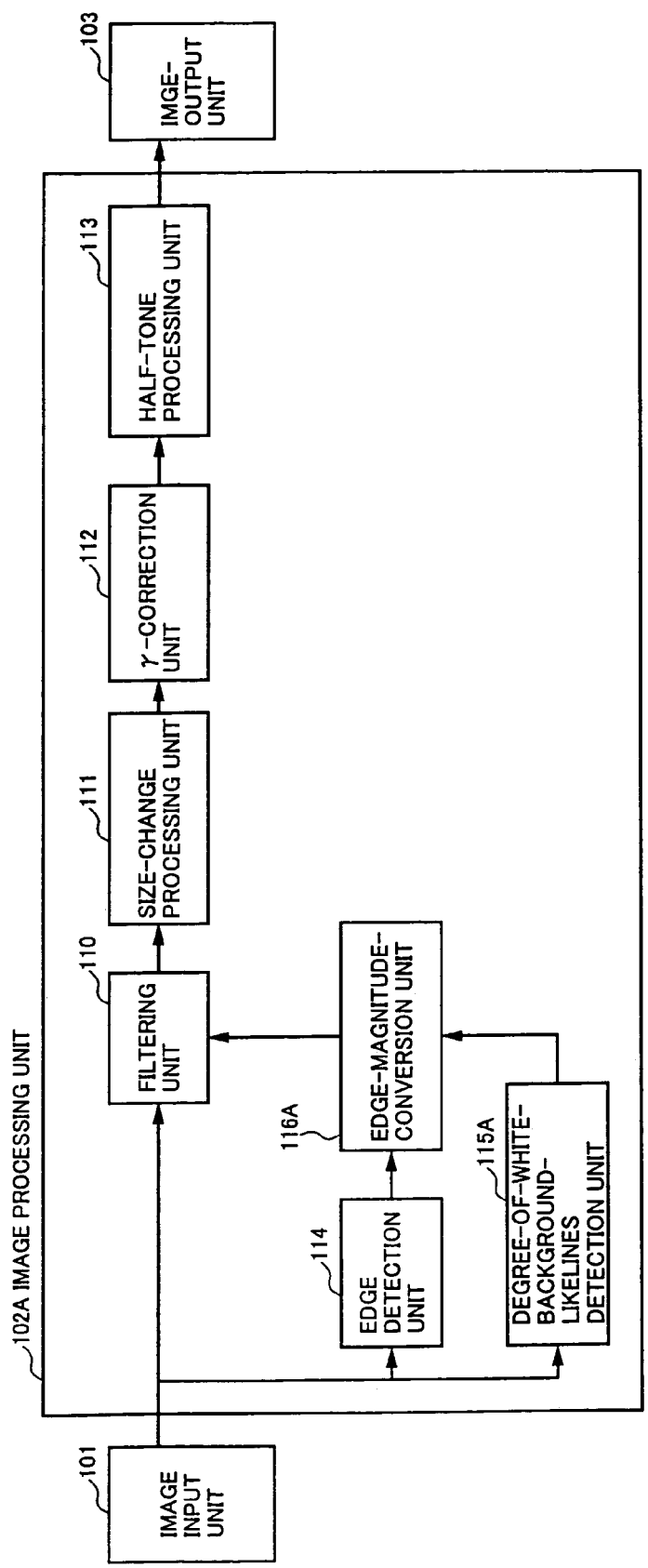
FIG. 34 is a block diagram of an image processing device according to a third embodiment of the present invention.

FIG. 34 is a block diagram of an image processing device according to a third embodiment of the present invention. In FIG. 34, the same elements as those of FIG. 1 are referred to by the same numerals, and a description thereof will be omitted.

In the image processing device according to the third embodiment shown in FIG. 34, an image processing unit 102A is provided in place of the image processing unit 102 shown in FIG. 1. In the image processing unit 102A, a degree-of-white-background-likeliness detection unit 115A is provided in place of the white-background detection unit 115. The degree-of-white-background-likeliness detection unit 115A detects a degree of white-background likeliness with respect to each area of the provided image, and supplies the detection results to the edge-magnitude-conversion unit 116A. The edge-magnitude-conversion unit 116A operates in response to the detection results of the degree of white-background likeliness, and controls magnitudes of edges according to the degree of white-background likeliness.

Figure 35:
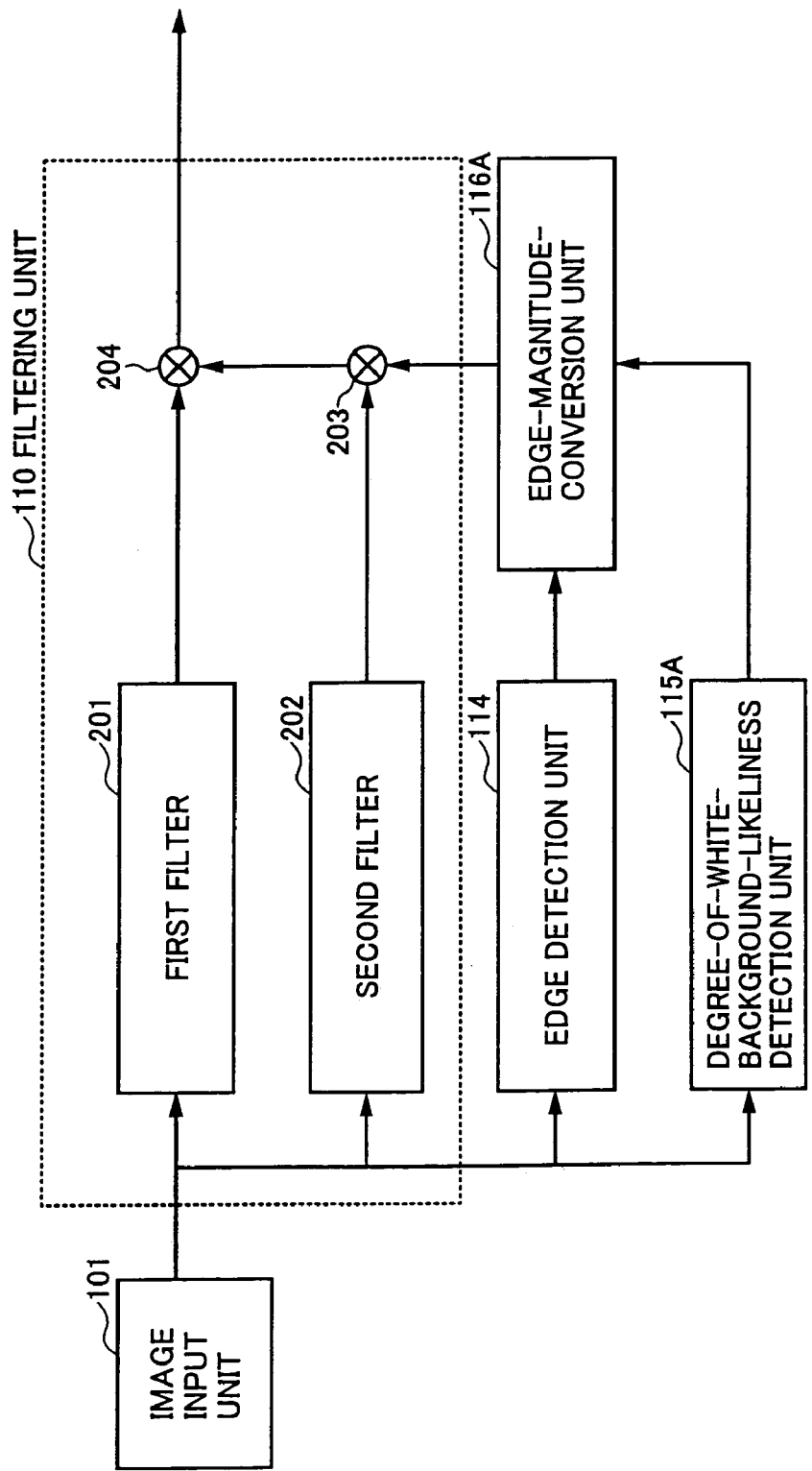
FIG. 35 is a block diagram showing a configuration of a filtering unit and nearby units relevant thereto.

FIG. 35 is a block diagram showing a configuration of the filtering unit 110 and the nearby units relevant thereto.

In the first embodiment shown in FIG. 2, the output of the edge-magnitude-conversion unit 116 is a continuous value (a discreet value assuming one of the pre-assigned multi-levels to be exact), reflecting the fact that the edge magnitude is a continuous value. The output of the edge-magnitude-conversion unit 116 is supplied as a weight factor to the filtering unit 110, and the output of the second filter 202 is multiplied by this weight factor, followed by the result of multiplication being added to the output of the first filter 201. It should be noted, however, that the output of the white-background detection unit 115 in the first embodiment is a binary value assuming either 0 or 1, so that a choice between the filter factor C1 and the filter factor C2 is only a two-way choice. If the output of the edge detection unit 114 is the same, therefore, the output of the edge-magnitude-conversion unit 116 shown in FIG. 2 changes only between two values, depending on whether it is a white background area or a non-white background area.

In the third embodiment shown in FIG. 35, the output of the degree-of-white-background-likeliness detection unit 115A is a continuous value (a discreet value assuming one of the pre-assigned multi-levels to be exact). Because of this, even if the output of the edge detection unit 114 stays the same, the output of the edge-magnitude-conversion unit 116A changes on a continuous scale to assume one of the multi-levels, depending on the detection results of the degree of white-background likeliness. It is thus possible to control the filter characteristics of the filtering unit 110 on a multi-level basis in response to the degree of white-background likeliness.

Figure 36:
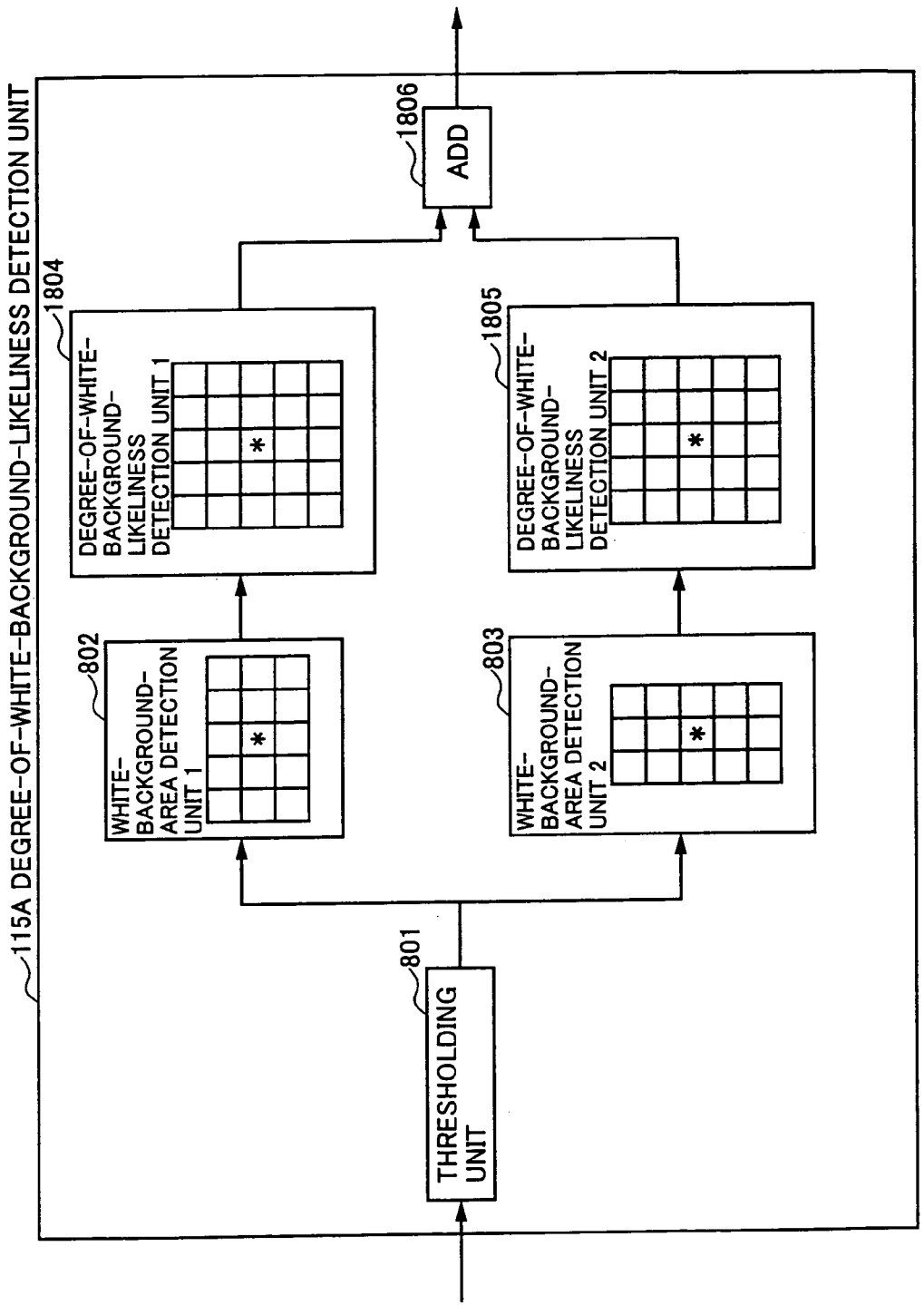
FIG. 36 is an illustrative drawing for explaining operation of a degree-of-white-background-likeliness detection unit.

FIG. 36 is an illustrative drawing for explaining operation of the degree-of-white-background-likeliness detection unit 115A.

The degree-of-white-background-likeliness detection unit 115A includes the thresholding unit 801, the first white-background-area detection unit 802, the second white-background-area detection unit 803, a first degree-of-white-background-likeliness detection unit 1804, a second degree-of-white-background-likeliness detection unit 1805, and an adder unit 1806. In FIG. 36, the same elements as those of FIG. 10 will be referred to by the same numerals, and a description thereof will be omitted.

In the same manner as in the first embodiment, the thresholding unit 801 performs thresholding processing on a received image, and the first white-background-area detection unit 802 and the second white-background-area detection-unit 803 detect white-background areas in the horizontal direction and in the vertical direction, respectively. Namely, the first white-background-area detection unit 802 and the second white-background-area detection unit 803 receive the binary image, and check whether all pixels inside an area of interest are white pixels. If they are, a pixel of current interest (shown as X in FIG. 36) is marked as a white-background-area pixel. If there is a black pixel inside the area of interest, the pixel of current interest is marked as non-white-background-area pixel. In this embodiment, the first white-background-area detection unit 802 checks a 5×3 rectangular area centering at the pixel X of current interest and extending longer in the horizontal direction, and the second white-background-area detection unit 803 checks a 3×5 rectangular area centering at the pixel X of interest and extending longer in the vertical direction.

In the third embodiment, the first degree-of-white-background-likeliness detection unit 1804 and the second degree-of-white-background-likeliness detection unit 1805 detect the degree of white-background likeliness based on the image in which white-background areas are detected.

Namely, the first degree-of-white-background-likeliness detection unit 1804 counts the number of white-background-area pixels detected by the first white-background-area detection unit 802 where the counting is carried out within an area of a predetermined size that includes a pixel X of new interest. By the same token, the second degree-of-white-background-likeliness detection unit 1805 counts the number of white-background-area pixels detected by the second white-background-area detection unit 803 where the counting is carried out within an area of a predetermined size that includes a pixel X of new interest. In this embodiment, the first degree-of-white-background-likeliness detection unit 1804 and the second degree-of-white-background-likeliness detection unit 1805 have a 5×5 pixel block as the area for counting the pixels, and the pixel X of interest is the center pixel of each block.

After this, the adder unit 1806 adds up the numbers of white-background-area pixels counted by the first and second degree-of-white-background-likeliness detection units 1804 and 1805, and standardizes the obtained sum by the number of total pixels (i.e., 50 pixels with 25 pixels for each unit in this embodiment). The standardized sum is output as a detection result of the degree-of-white-background-likeliness detection unit 115A.

Figure 37:
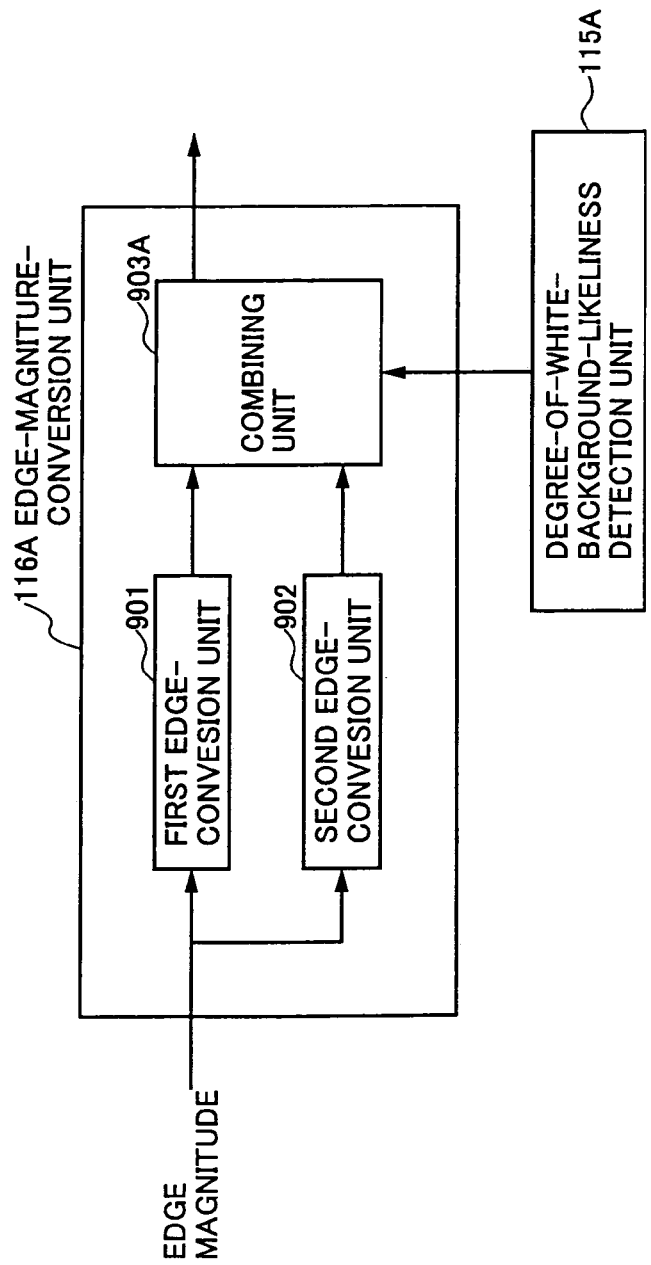
FIG. 37 is a block diagram showing a configuration of an edge-magnitude-conversion unit.

FIG. 37 is a block diagram showing a configuration of the edge-magnitude-conversion unit 116A.

The edge-magnitude-conversion unit 116A includes the first edge-conversion unit 901, the second edge-conversion unit 902, and a combining unit 903A. In FIG. 37, the same elements as those of FIG. 11 are referred to by the same numerals, and a description thereof will be omitted.

The edge-magnitude-conversion unit 116A has a function to convert the edge magnitude obtained by the edge detection unit 114 in accordance with the degree of white-background likeliness obtained by the degree-of-white-background-likeliness detection unit 115A. The edge magnitude from the edge detection unit 114 is supplied to the first edge-conversion unit 901 having the conversion characteristic suitable for the white-background areas, and is also supplied to the second edge-conversion unit 902 having the conversion characteristic suitable for the non-white-background areas. These units convert the edge magnitude into respective filter factors in accordance with their respective conversion characteristics. The first edge-conversion unit 901 and the second edge-conversion unit 902 are the same as those used in the first embodiment, and their conversion characteristics are shown in FIG. 12 and FIG. 13, respectively.

The combining unit 903A receives the filter factors from the first edge-conversion unit 901 and the second edge-conversion unit 902, and combines these filter factors according to weight factors reflecting the detected degree of white-background likeliness.

Figure 38:
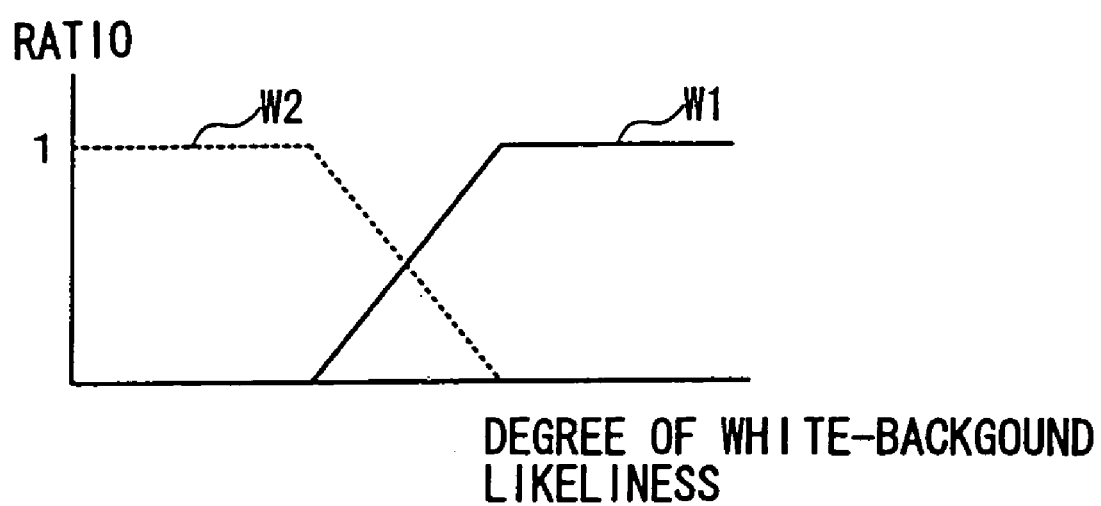
FIG. 38 is a chart showing weight factors used in a combining process of a combining unit.

FIG. 38 is a chart showing weight factors used in the combining process of the combining unit 903.

In FIG. 38, a weight factor W1 is used for the first edge-conversion unit 901, and a weight factor W2 is used for the second edge-conversion unit 902. The combining unit 903A multiplies the filter factor of the first edge-conversion unit 901 by the weight factor W1, and multiplies the filter factor of the second edge-conversion unit 902 by the weight factor W2, followed by adding up the results of multiplication.

As a result, the output of the second edge-conversion unit 902 is given priority in areas where the degree of white-background likeliness is relatively small, while the output of the first edge-conversion unit 901 is given precedence in areas where the degree of white-background likeliness is relatively large. In the areas of intermediate degrees of white-background likeliness, the ratio of the weight factors used in the combining process is changed gradually as the degree of white-background likeliness changes.

In this manner, the filter characteristics can be adjusted to exhibit smooth changes over the boundary areas between the white-background areas and the non-white-background areas, thereby achieving smooth appearance of reproduced images around the boundary areas. In the first embodiment which makes a binary-wise check in the white-background detection, the nature of processing is simple, helping to achieve a scaled-down hardware configuration and cost reductions. Since the filter characteristics change stepwise across the boundary areas between white-background areas and non-white-background areas, however, line drawings may develop jagged appearance. The third embodiment, on the other hand, suppresses jagged appearance of line drawings in areas between white-background areas and the non-white-background areas.

Figure 39:
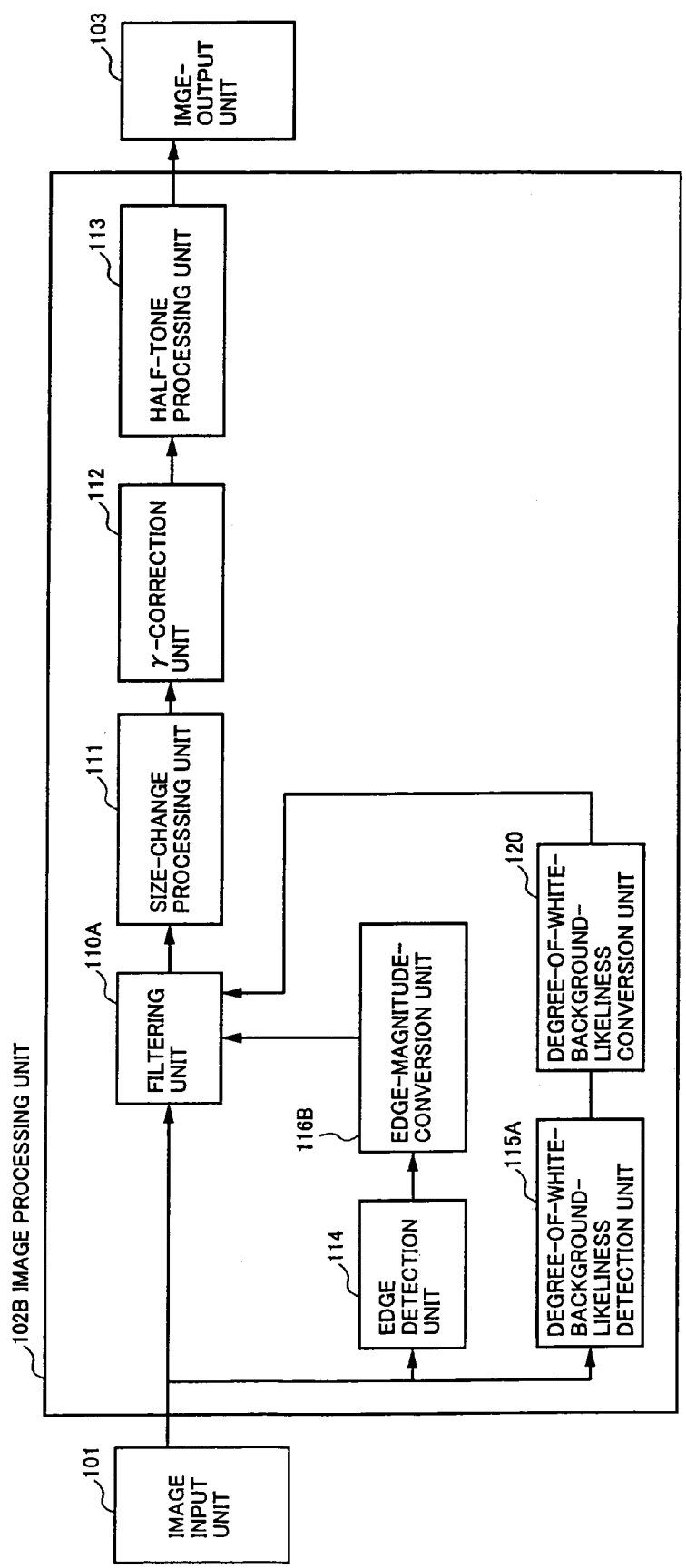
FIG. 39 is a block diagram showing a variation of the image processing device according to the third embodiment of the present invention.

FIG. 39 is a block diagram showing a variation of the image processing device according to the third embodiment of the present invention.

In FIG. 39, the same elements as those of FIG. 34 are referred to by the same numerals, and a description thereof will be omitted.

The image processing device according to a variation of the third embodiment shown in FIG. 39 is provided with an image processing unit 102B in place of the image processing unit 102A of FIG. 34. In the image processing unit 102B, an edge-magnitude-conversion unit 116B is provided in place of the edge-magnitude-conversion unit 116A of FIG. 34, and a filtering unit 110A replaces the filtering unit 110 of FIG. 34. Further, the output of the degree-of-white-background-likeliness detection unit 115A is supplied to a newly provided degree-of-white-background-likeliness conversion unit 120. The degree-of-white-background-likeliness conversion unit 120 converts the degree of white-background likeliness to output a converted degree of white-background likeliness. The filtering unit 110A receives the converted degree of white-background likeliness from the degree-of-white-background-likeliness conversion unit 120, and further receives a filter factor from the edge-magnitude-conversion unit 116B.

Figure 40:
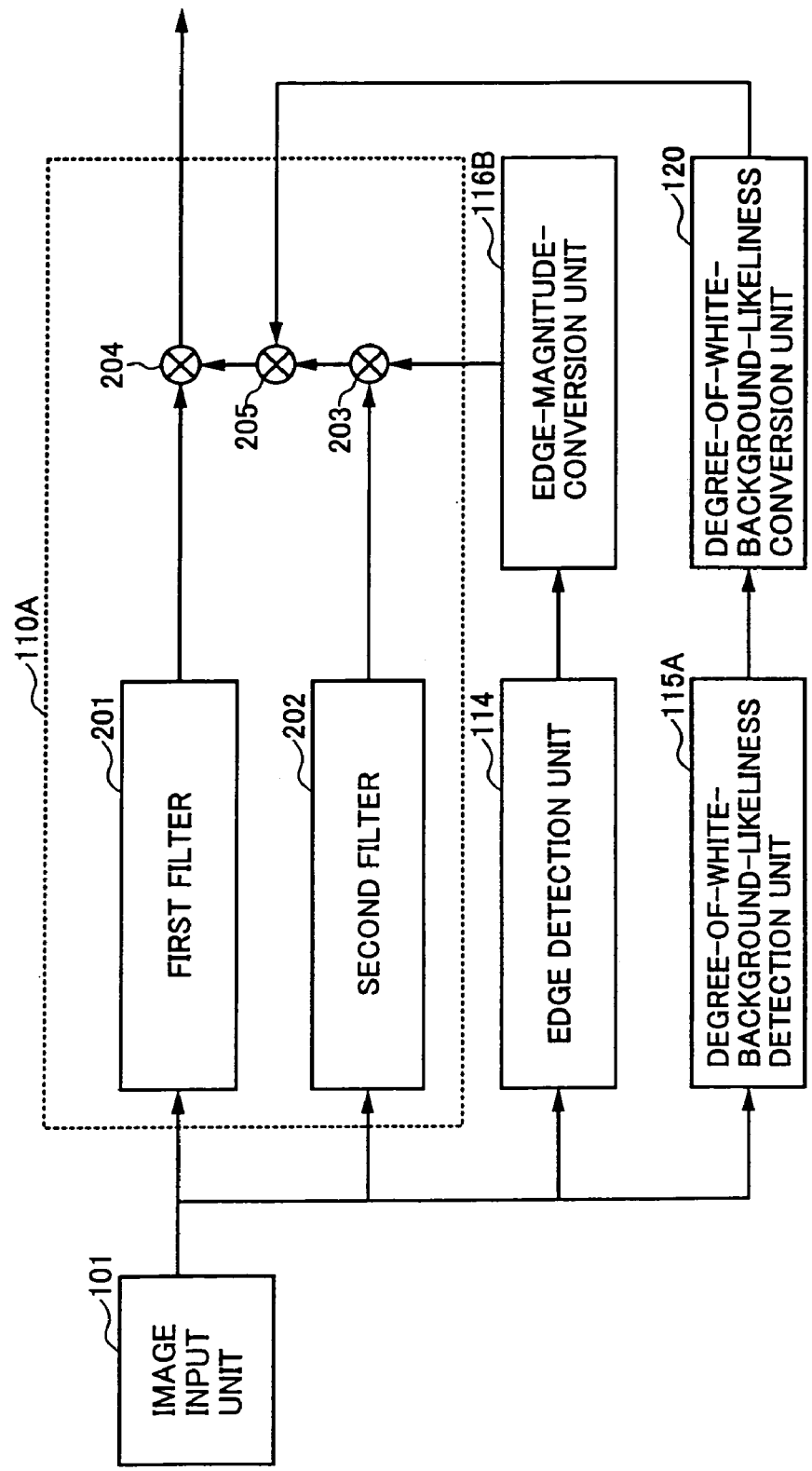
FIG. 40 is a block diagram showing a configuration of a filtering unit and surrounding units relevant thereto.

FIG. 40 is a block diagram showing a configuration of the filtering unit 110A and the surrounding units relevant thereto. In FIG. 40, the same elements as those of FIG. 35 are referred to by the same numerals, and a description thereof will be omitted.

As shown in FIG. 40, the filtering unit 110A has a multiplication unit 205 newly provided in addition to the configuration of the filtering unit 110.

The output of the edge-magnitude-conversion unit 116B is used as a weighting factor in multiplication processing for the output of the second filter 202, and the result of multiplication is further multiplied by the converted degree of white-background likeliness supplied from the degree-of-white-background-likeliness conversion unit 120. The result of the second multiplication processing is added to the output of the first filter 201.

The edge-magnitude-conversion unit 116B is a simple conversion table that converts edge magnitudes into filter factors, which are the output of the edge-magnitude-conversion unit 116B. The conversion characteristic of the edge-magnitude-conversion unit 116B may be that of FIG. 12, for example. The degree-of-white-background-likeliness conversion unit 120 is a conversion table for converting the degree of white-background likeliness into the converted degree of white-background likeliness.

Figure 41:
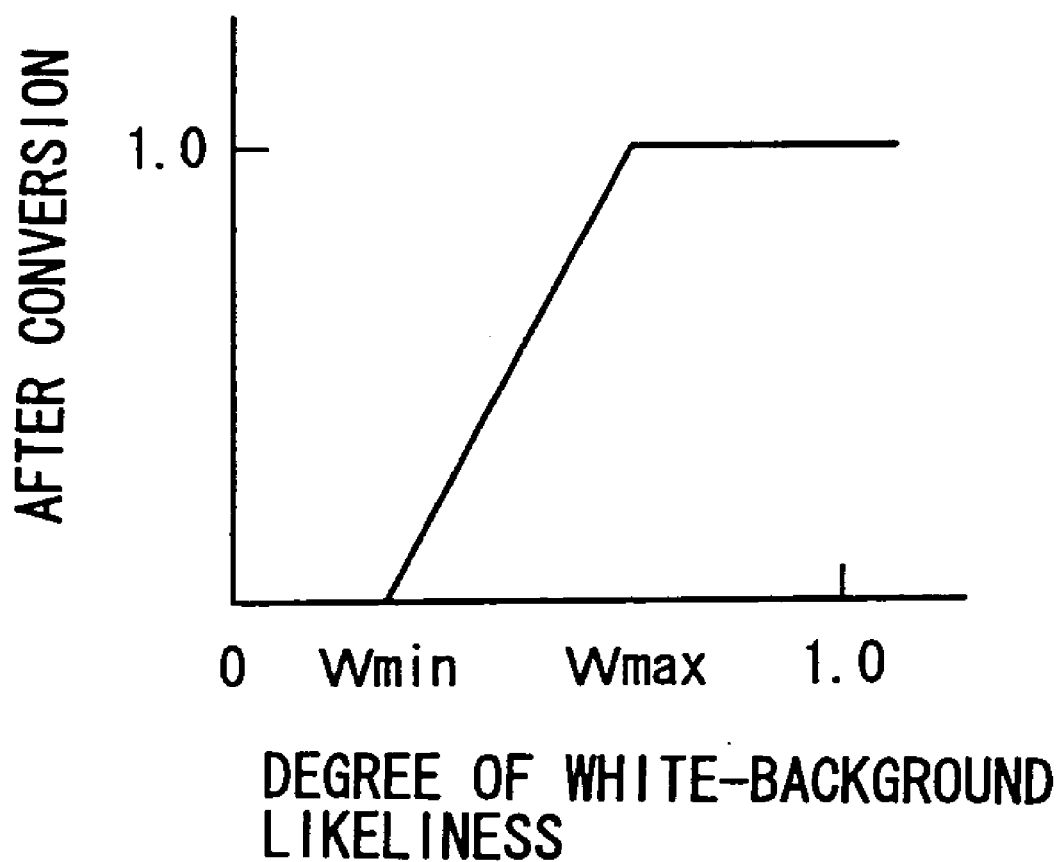
FIG. 41 is a chart showing a conversion characteristic of a degree-of-white-background-likeliness conversion unit.

FIG. 41 is a chart showing a conversion characteristic of the degree-of-white-background-likeliness conversion unit 120.

In FIG. 41, the horizontal axes represents the degree of white-background likeliness as an input to the unit, and the vertical axis represents the converted degree of white-background likeliness as an output of the unit. Up to the point where the degree of white-background likeliness reaches Wmin, the converted degree of white-background likeliness remains zero. If the degree of white-background likeliness exceeds Wmax, the converted degree of white-background likeliness is 1. Between Wmin and Wmax, the converted degree of white-background likeliness linearly increases from 0 to 1. In FIG. 41, the degree of white-background likeliness supplied as an input is standardized between 0 and 1. Alternatively, the total number of pixel counts (up to 50 pixels in this embodiment) without standardization may be input as the degree of white-background likeliness.

As has been explained in connection with FIG. 40, the output of second filter 202 is multiplied by the output of the edge-magnitude-conversion unit 116B, and is further multiplied by the output of the degree-of-white-background-likeliness conversion unit 120, followed by the result of the second multiplication being supplied to the first filter 201. The converted degree of white-background likeliness that is output from the degree-of-white-background-likeliness conversion unit 120 is about 1 in areas where the degree of white-background likeliness is relatively large. In such areas, what is added to the output of the first filter 201 is nearly equal to the product of the output of the second filter 202 and the output of the edge-magnitude-conversion unit 116B. This results in strong edge enhancement. In areas where the degree of white-background likeliness is relatively small, the converted degree of white-background likeliness output from the degree-of-white-background-likeliness conversion unit 120 is about 0. In such areas, the product of the output of the second filter 202 and the output of the edge-magnitude-conversion unit 116B is substantially suppressed, so that the output of the first filter 201 becomes predominant. Excessive enhancement can thus be avoided in non-white-background areas.

Further, gradual changes of filter characteristics over the boundary areas between white-background areas and non-white-background areas make it sure that reproduced images in the boundary areas have smooth appearance.

Figure 42:
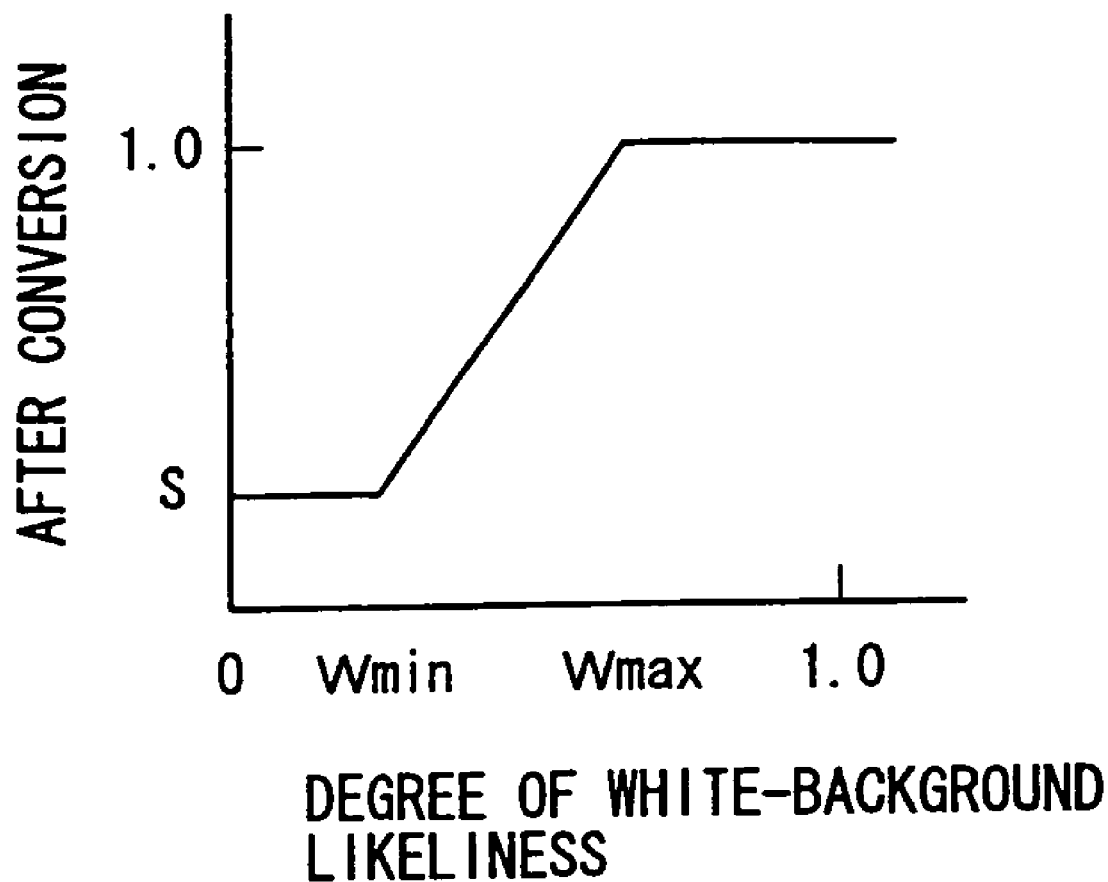
FIG. 42 is a chart showing another example of a conversion characteristic of the degree-of-white-background-likeliness conversion unit.

In FIG. 41, the conversion characteristic becomes zero in a range of the degree of white-background likeliness that is below Wmin. AS shown in FIG. 42, however, the conversion characteristic may be configured so as not to become zero even in the ranges below Wmin, thereby maintaining a slight effect of edge enhancement by the second filter 202 even in the non-white-background areas. In this case, edge enhancement is effective even with respect to areas where strong edges are present such as mesh-dot areas or continuous-tone image areas.

<Fourth Embodiment>

In the fourth embodiment, the degree of white-background likeliness is employed that evaluates how close to a white background an area of interest is. Based on the degree of white-background likeliness, the characteristics of gamma correction are controlled. The degree of white-background likeliness varies from a minimum to a maximum (e.g., from 0 to 1) on a multi-level scale, so that a multi-level choice of the gamma-correction characteristics can be made rather than a choice between only two alternatives.

Figure 43:
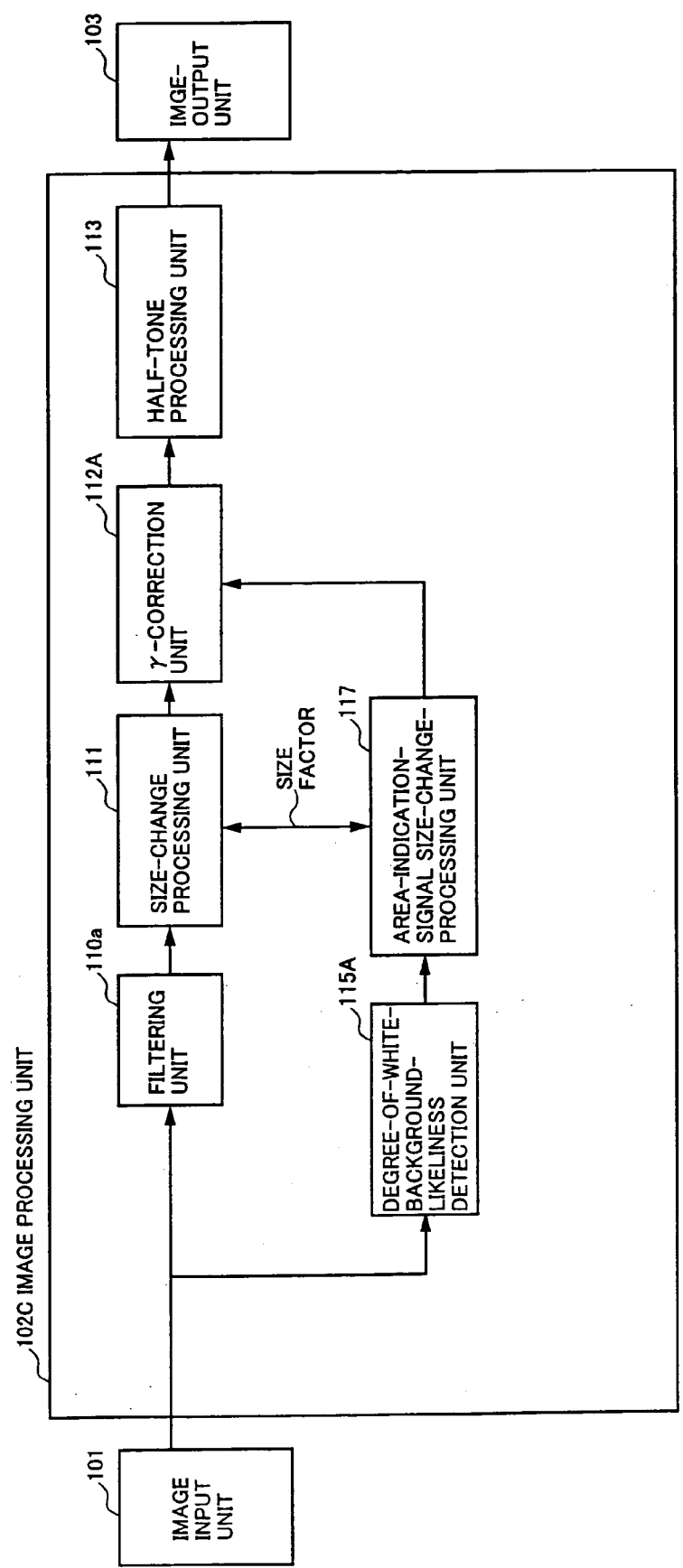
FIG. 43 is a block diagram of an image processing device according to a fourth embodiment of the present invention.

FIG. 43 is a block diagram of an image processing device according to a fourth embodiment of the present invention.

In FIG. 43, the same elements as those of FIG. 15 are referred to by the same numerals, and a description thereof will be omitted.

In the image processing device according to the fourth embodiment shown in FIG. 43, an image processing unit 102C is provided in place of the image processing unit 102a shown in FIG. 15. In the image processing unit 102C, the degree-of-white-background-likeliness detection unit 115A is provided in place of the white-background detection unit 115, and a gamma-correction unit 112A is provided to replace the gamma-correction unit 112 shown in FIG. 15. The degree-of-white-background-likeliness detection unit 115A is shown in FIG. 36, and detects a degree of white-background likeliness with respect to each area of the provided image, followed by supplying the results of detection to the gamma-correction unit 112A via intervening size-change processing. The gamma-correction unit 112A operates in response to the detection results of the degree of white-background likeliness, and controls magnitudes of gamma-correction factors according to the degree of white-background likeliness.

Figure 44:
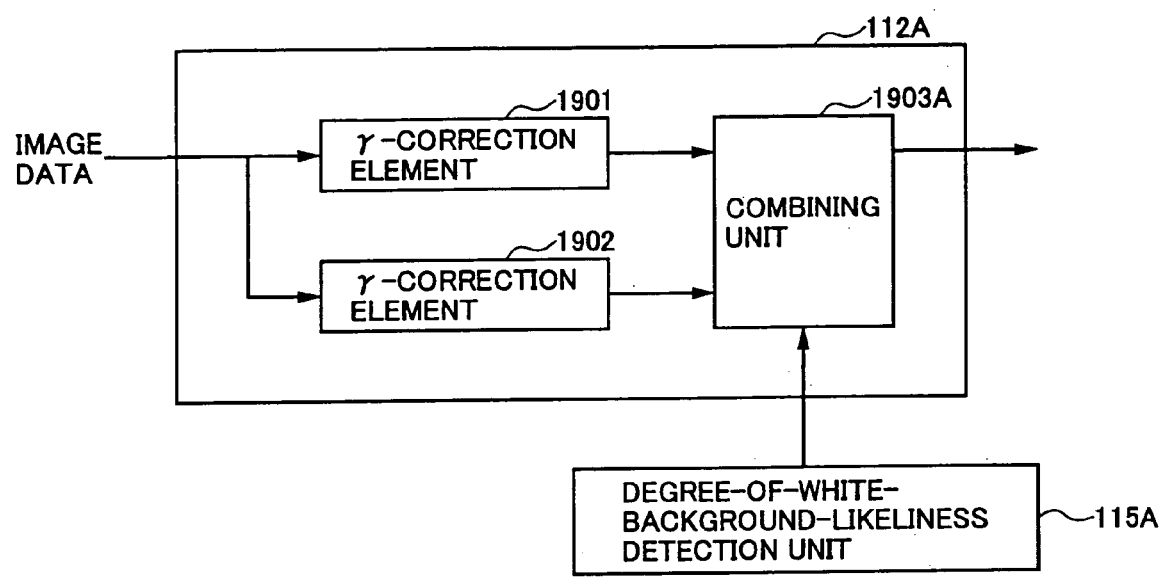
FIG. 44 is a block diagram showing a configuration of a gamma-correction unit shown in FIG. 43.

FIG. 44 is a block diagram showing a configuration of the gamma-correction unit 112A.

The gamma-correction unit 112A shown in FIG. 44 includes the first gamma-correction element 1901, the second gamma-correction element 1902, and a combining unit 1903A. In FIG. 44, the same elements as those of FIG. 19 are referred to by the same numerals, and a description thereof will be omitted.

The gamma-correction unit 112A has a function to convert the supplied image-gray levels according to the degree of white-background likeliness. The image-gray levels are supplied to the first gamma-correction element 1901 suitable for non-white-background areas and to the second gamma-correction element 1902 suitable for white-background areas, and are subjected to different gamma corrections according to respective conversion characteristics. The first gamma-correction element 1901 and the second gamma-correction element 1902 are the same as those of the second embodiment, and have respective conversion characteristics A and B shown in FIG. 20.

The combining unit 1903A receives the image-gray levels from the first gamma-correction element 1901 and the second gamma-correction element 1902, and combines these image-gray levels according to weight factors reflecting the degree of white-background likeliness.

Figure 45:
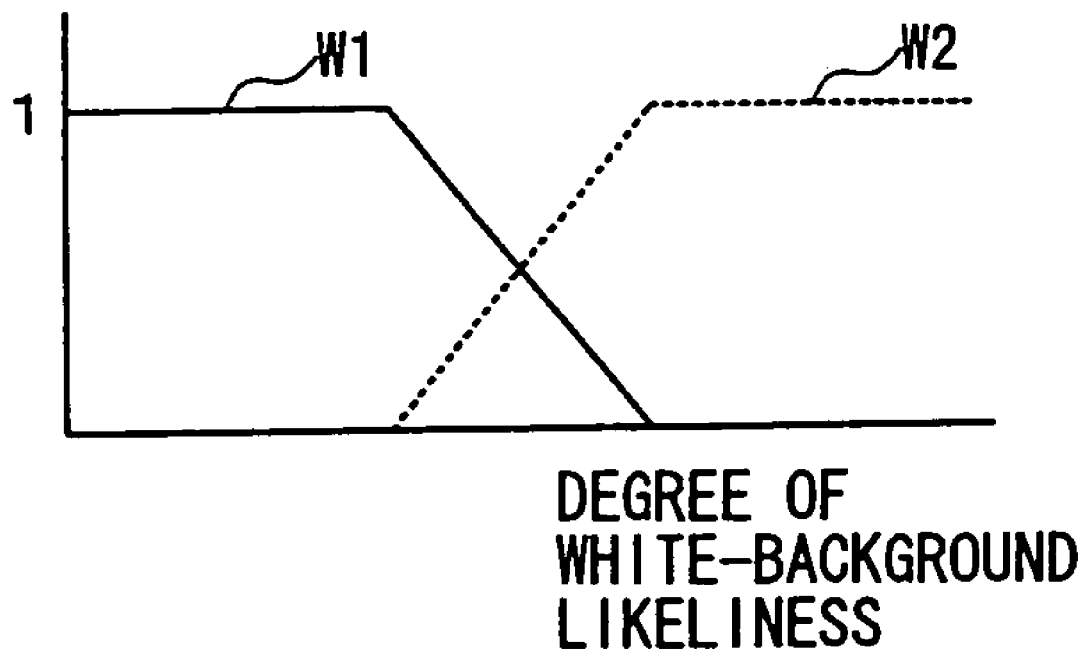
FIG. 45 is a chart showing weight factors used in a combining process of a combining unit shown in FIG. 44.

FIG. 45 is a chart showing weight factors used in the combining process of the combining unit 1903A.

In FIG. 45, a weight factor W1 is used for the first gamma-correction element 1901, and a weight factor W2 is used for the second gamma-correction element 1902. The combining unit 1903A multiplies the output of first gamma-correction element 1901 by the weight factor W1, and multiplies the output of the second gamma-correction element 1902 by the weight factor W2, followed by adding up the results of multiplication.

As a result, the output of the second gamma-correction element 1902 is given priority in areas where the degree of white-background likeliness is relatively large, while the output of the first gamma-correction element 1901 is given precedence in areas where the degree of white-background likeliness is relatively small. In the areas of intermediate degrees of white-background likeliness, the ratio of the weight factors used in the combining process is changed gradually as the degree of white-background likeliness changes.

In this manner, the conversion factor of the gamma correction can be adjusted to exhibit smooth changes over the boundary areas between the white-background areas and the non-white-background areas, thereby achieving smooth appearance of reproduced images around the boundary areas.

Figure 46:
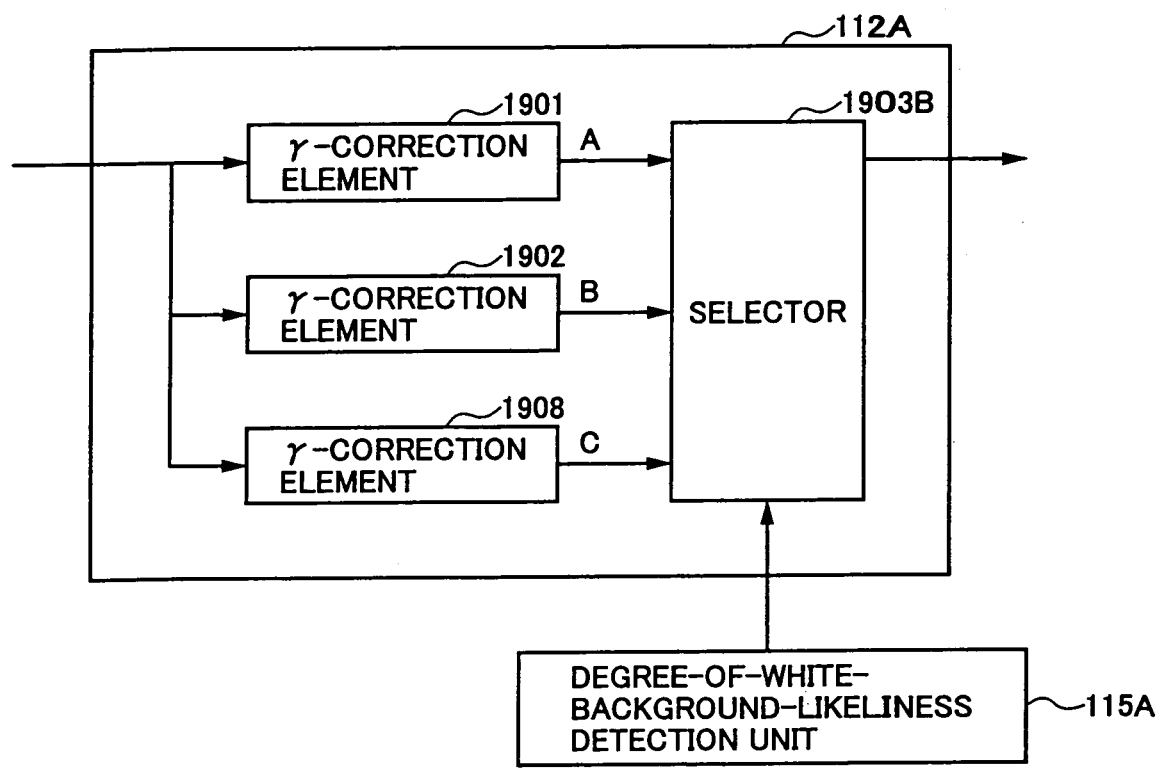
FIG. 46 is a block diagram showing a variation of the gamma-correction unit shown in FIG. 43.

FIG. 46 is a block diagram showing a variation of the gamma-correction unit 112A.

The gamma-correction unit 112A of FIG. 46 includes the first gamma-correction element 1901, the second gamma-correction element 1902, a third gamma-correction element 1908, and a selector unit 1903B. In FIG. 46, the same elements as those of FIG. 19 are referred to by the same numerals, and a description thereof will be omitted.

Figure 47:
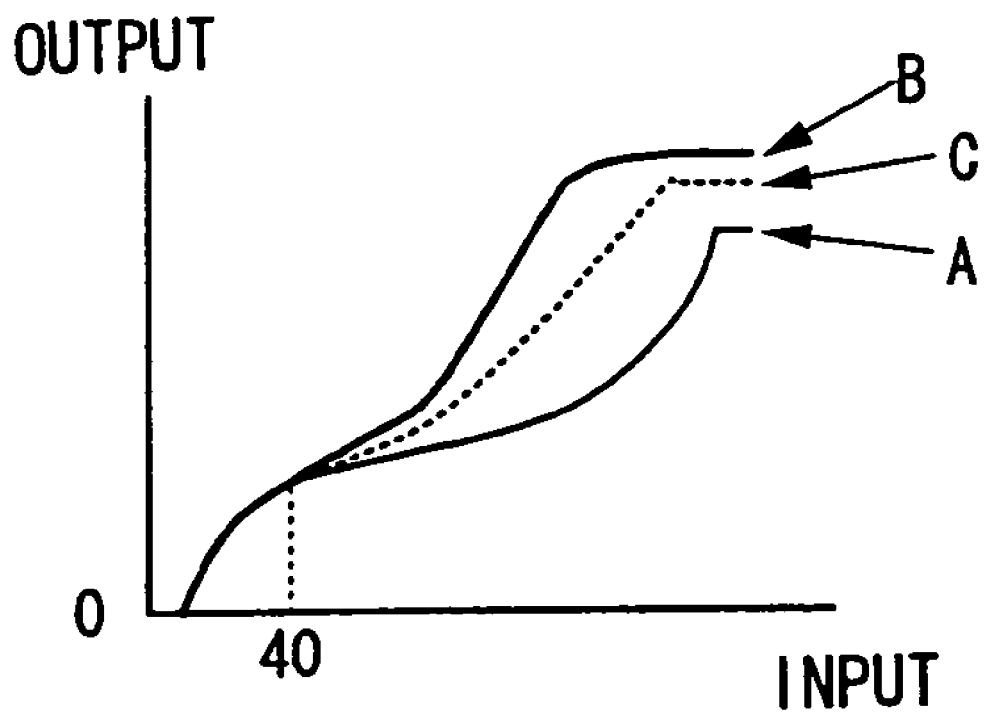
FIG. 47 is a chart showing gray-level conversion characteristics of a first gamma-correction element, a second gamma-correction element, and a third gamma-correction element shown in FIG. 46.

The gamma-correction unit 112A has a function to convert the supplied image-gray levels according to the degree of white-background likeliness. The image-gray levels are supplied to the first gamma-correction element 1901 suitable for non-white-background areas, the second gamma-correction element 1902 suitable for white-background areas, and the third gamma-correction element 1908 suitable for intermediate areas, and are subjected to different gamma corrections according to respective conversion characteristics. The first gamma-correction element 1901, the second gamma-correction element 1902, and the third gamma-correction element 1908 have respective conversion characteristics A, B, and C shown in FIG. 47.

The selector unit 1903B selects one of the image-gray levels supplied from the first gamma-correction element 1901, the second gamma-correction element 1902, and the third gamma-correction element 1908 according to the degree of white-background likeliness.

Figure 48:
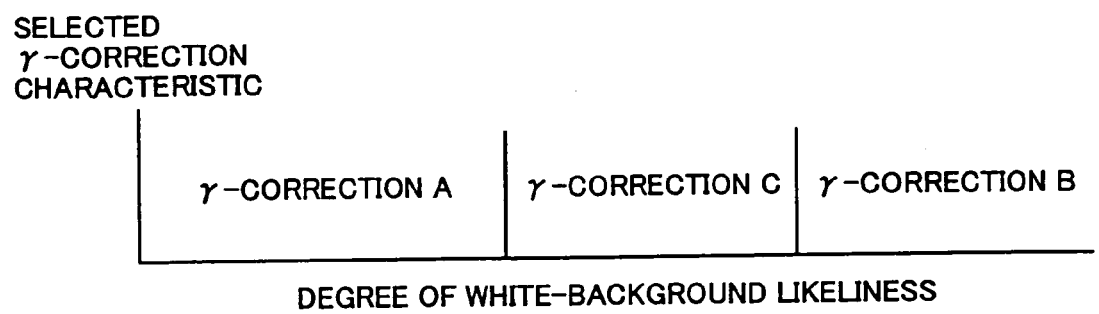
FIG. 48 is an illustrative drawing showing selection of gamma-correction characteristics by a selector unit according to degrees of white-background likeliness.

FIG. 48 is an illustrative drawing showing selection of gamma-correction characteristics by the selector unit according to the degree of white-background likeliness.

As shown in FIG. 48, the selector unit 1903B selects the output of the first gamma-correction element 1901 having the conversion characteristic A in areas of relatively small degrees of white-background likeliness, the output of the third gamma-correction element 1908 having the conversion characteristic C in areas of intermediate degrees of white-background likeliness, and the output of the second gamma-correction element 1902 in areas of relatively large degrees of white-background likeliness. Such control makes it possible to change the conversion characteristics on a multi-level scale in accordance with the degree of white-background likeliness even through conversion characteristics are chosen by a selector. As a result, the same advantages as those of the fourth embodiment can be obtained.

It should be noted that the third and fourth embodiments described above may be generic to the first and second embodiments, respectively, in a sense that the degree of white-background likeliness on a continuous (multi-level) scale may be generic to a binary check as to whether areas are white-background areas or non-white-background areas. Accordingly, the variations, features, advantages of the first and second embodiments described in connection with the respective embodiments are applicable to the third and fourth embodiments, and the present invention is intended to include such variations within the scope of the invention.

According to the present invention as described above, the image processing device includes a filtering unit which filters an input image with variable frequency characteristics, an edge detection unit which detects magnitudes of edges appearing in the input image, and a degree-of-white-background-likeliness detection unit which detects degrees of white-background likeliness in respect of local areas of the input image, wherein the filtering unit changes the variable frequency characteristics in response to the magnitudes of edges and to the degrees of white-background likeliness.

In detail, the image processing device described above has the filter frequency characteristics changed so as to enhance high frequency components to an increased degree as the degrees of white-background likeliness increase and as the magnitudes of edges increase. This makes it possible to reliably improve sharpness of letters and line drawings on the white backgrounds by use of a simple device configuration.

Further, use of degrees of white-background likeliness provided on a continuous scale makes it possible to achieve the continuous and gradual adjustment of filter characteristics over the boundary areas between white background areas and non-white-background areas. This achieves smooth appearance of reproduced images in the boundary areas. Even when the image processing is based on binary-wise checks as to whether areas are white-background areas or non-white-background areas, proper image processing is attainable by detecting the white-background areas and the boundary areas thereof.

Moreover, the filtering unit may include a first filter having a frequency characteristic that is space invariant over all the areas of the input image, and include a second filter having a high-frequency-enhancement characteristic with an output thereof adjusted according to the magnitudes of edges and the degrees of white-background likeliness, wherein the frequency characteristic of the first filter maintains sharpness of letters and line drawings while suppressing generation of moiré in the mesh-dot areas. With this configuration, the image processing device can reproduce clear edges in continuous-tone image areas such as photograph areas while suppressing generation of moiré in mesh-dot image areas.

Further, according to another aspect of the present invention, the image processing device includes a degree-of-white-background-likeliness detection unit which detects degrees of white-background likeliness in respect of local areas of an input multi-level image, and a gray-level conversion unit which converts gray levels of the input multi-level image according to conversion characteristics that change in response to the degrees of white-background likeliness.

According to the image processing device as described above, the gray levels of the input image are converted according to different gray-level conversion characteristics varying depending on the degrees of white-background likeliness. The image processing device can thus improve reproduction quality of letter and line drawings on the white backgrounds.

Further, use of degrees of white-background likeliness provided on a continuous scale makes it possible to achieve the continuous and gradual adjustment of gray-level conversion characteristics over the boundary areas between white background areas and non-white-background areas. This achieves smooth appearance of reproduced images in the boundary areas. Even when the image processing is based on binary-wise checks as to whether areas are white-background areas or non-white-background areas, proper image processing is attainable by detecting the white-background areas and the boundary areas thereof.

Moreover, when image signals supplied to the area detection unit that detects white-background areas and non-white-background areas are subjected to proper filtering in advance, accuracy of the area detection can be improved as the filtering process smoothes out isolated dots.

When image signals supplied to the area detection unit that detects white-background areas and non-white-background areas are subjected to size-change processing in advance, no dedicated unit for size-change processing is necessary for outputs of area detection. This makes it possible to achieve the same advantages with less costly equipment.

Moreover, the image in which areas are detected may be divided into blocks each comprised of m×n pixels. This provides a basis for reducing size of the area data to 1/(m×n) as large. If these blocks are square shaped, image editing such as image rotation can be easily performed.

Further, the present invention is not limited to these embodiments, but various variations and modifications may be made without departing from the scope of the present invention.

The present application is based on Japanese priority application No. 2000-264421 filed on Aug. 31, 2000, with the Japanese Patent Office, the entire contents of which are hereby incorporated by reference.

What is claimed is:

1. An image processing device, comprising:
   a filtering unit which filters an input image with variable frequency characteristics;
   an edge detection unit which detects magnitudes of edges appearing in the input image; and
   a degree-of-white-background-likeliness detection unit which detects degrees of white-background likeliness in respect of local areas of the input image, wherein said filtering unit changes the variable frequency characteristics in response to the magnitudes of edges and to the degrees of white-background likeliness.

2. An image processing device, comprising:
   a thresholding unit configured to binarize input multi-level image data with a predetermined threshold value to generate binary image data;
   a white-background-area-pixel detection unit configured to mark a pixel of interest as white-background-area pixel in the binary image data if all pixels inside a rectangular area including the pixel of interest are white pixels, and to mark the pixel of interest as a non-white-background-area pixel in the binary image data if all the pixels inside the rectangular area including the pixel of interest are not white pixels;
   a degree-of-white-background-likeliness detection unit configured to count, inside a new rectangular area including a pixel of new interest, a number of pixels that are marked as white-background-area pixels by the white-background-area-pixel detection unit, and configured to obtain a degree of white-background likeliness that is a ratio of the number of white-background-area pixels to a total number of pixels inside the new rectangular area; and
   a gray-level conversion unit configured to convert gray levels of the input multi-level image data according to conversion characteristics that change in response to the degree of white-background likeliness.

3. An image processing device, comprising:
   a thresholding unit configured to binarize input multi-level image data with a predetermined threshold value to generate binary image data;
   a white-background-area-pixel detection unit configured to mark a pixel of interest as a white-background-area pixel in the binary image data if all pixels inside a rectangular area including the pixel of interest are white pixels, and to mark the pixel of interest as a non-white-background-area pixel in the binary image data if all the pixels inside the rectangular area including the pixel of interest are not white pixels;

a degree-of-white-background-likeliness detection unit configured to count, inside a new rectangular area including a pixel of new interest, a number of pixels that are marked as white-background-area pixels by the white-background-area-pixel detection unit, and configured to obtain a degree of white-background likeliness that is a ratio of the number of white-background-area pixels to a total number of pixels inside the new rectangular area; and a filtering unit configured to apply a filtering process to the input multi-level image data while changing frequency characteristics of the filtering process in response to the degree of white-background likeliness.

* * * * *